United States Patent
Vacon et al.

(10) Patent No.: US 12,003,626 B2
(45) Date of Patent: *Jun. 4, 2024

(54) SYSTEM AND METHOD OF VERIFICATION, AUTHENTICATION, AND/OR CERTIFICATION USING ENTANGLED PHOTONS

(71) Applicant: Qubit Moving and Storage, LLC, Franconia, NH (US)

(72) Inventors: Gary Vacon, East Falmouth, MA (US); Kristin A. Rauschenbach, Franconia, NH (US)

(73) Assignee: Qubit Moving and Storage, LLC, Franconia, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,679

(22) Filed: Jun. 27, 2023

(65) Prior Publication Data

US 2023/0336336 A1    Oct. 19, 2023

Related U.S. Application Data

(63) Continuation-in-part of application No. 18/174,636, filed on Feb. 26, 2023, which is a continuation of
(Continued)

(51) Int. Cl.
*H04L 9/08* (2006.01)
*G06N 10/40* (2022.01)
*H04L 9/32* (2006.01)

(52) U.S. Cl.
CPC .......... *H04L 9/0852* (2013.01); *G06N 10/40* (2022.01); *H04L 9/321* (2013.01)

(58) Field of Classification Search
CPC ........ H04L 9/0852; H04L 9/321; G06N 10/40
See application file for complete search history.

(56) References Cited

U.S. PATENT DOCUMENTS

| 5,418,905 A | 5/1995 | Rarity et al. |
|---|---|---|
| 6,028,935 A | 2/2000 | Rarity et al. |

(Continued)

FOREIGN PATENT DOCUMENTS

| CN | 109415201 A | 3/2019 |
|---|---|---|
| CN | 109586907 A | 4/2019 |

(Continued)

OTHER PUBLICATIONS

Quan et al., "Nonlocal temporal correlation identification of entangled photon pairs for quantum clock synchronization", 10 pages.
(Continued)

*Primary Examiner* — Baotran N To
(74) *Attorney, Agent, or Firm* — Rauschenbach Patent Law Group, PLLC; Kurt Rauschenbach

(57) ABSTRACT

A method of generating a nonce includes measuring a TOA and a corresponding first or second state value of a plurality of first photons, wherein respective ones of the plurality of first photons are entangled with respective ones of a plurality of second photons in a first basis, which is time, and entangled in a second basis. A first ordered list of the measured TOAs of the plurality of first photons is generated. A TOA and a corresponding first or second state value of the plurality of second photons are measured. A second ordered list of the measured TOA of the plurality of second photons is generated. TOA matches between the first ordered list and the second ordered list are determined. The first or second state values that correspond to the determined TOA matches between the first ordered list and the second ordered list are determined. A shared secret random number is determined using the first or second state values that correspond to the determined TOA matches. A nonce is established using at least part of the shared secret random number.

20 Claims, 18 Drawing Sheets

Related U.S. Application Data application No. 17/852,758, filed on Jun. 29, 2022, now Pat. No. 11,616,644, which is a continuation-in-part of application No. 17/465,235, filed on Sep. 2, 2021, now Pat. No. 11,614,771.

(60) Provisional application No. 63/356,975, filed on Jun. 29, 2022, provisional application No. 63/356,534, filed on Jun. 29, 2022, provisional application No. 63/218,433, filed on Jul. 5, 2021, provisional application No. 63/186,754, filed on May 10, 2021, provisional application No. 63/118,542, filed on Nov. 25, 2020.

(56) References Cited

U.S. PATENT DOCUMENTS

| | | | |
|---|---|---|---|
| 6,609,139 B1* | 8/2003 | Dultz | G06F 7/588 |
| | | | 708/250 |
| 7,028,275 B1 | 4/2006 | Chen et al. | |
| 7,072,432 B2 | 7/2006 | Belcea | |
| 7,242,774 B1 | 7/2007 | Elliott et al. | |
| 7,286,444 B1 | 10/2007 | Bahder et al. | |
| 7,581,100 B2 | 8/2009 | Mizrah | |
| 7,684,015 B2 | 3/2010 | Shih | |
| 7,812,303 B2 | 10/2010 | Meyers et al. | |
| 7,847,234 B2 | 12/2010 | Meyers et al. | |
| 8,053,715 B2 | 11/2011 | Meyers et al. | |
| 8,242,428 B2 | 8/2012 | Meyers et al. | |
| 8,269,978 B2 | 9/2012 | Capron et al. | |
| 8,373,107 B2 | 2/2013 | Meyers et al. | |
| 8,525,149 B2 | 9/2013 | Stevenson et al. | |
| 8,611,535 B2 | 12/2013 | Brodsky et al. | |
| 8,890,049 B2 | 11/2014 | Yuan et al. | |
| 8,983,303 B2 | 3/2015 | Meyers et al. | |
| 9,064,315 B2 | 6/2015 | Meyers et al. | |
| 9,131,128 B2 | 9/2015 | Meyers et al. | |
| 9,270,385 B2 | 2/2016 | Meyers et al. | |
| 9,331,843 B2 | 5/2016 | Silverman et al. | |
| 9,473,301 B2 | 10/2016 | Englund et al. | |
| 9,727,959 B2 | 8/2017 | Meyers et al. | |
| 9,934,469 B1 | 4/2018 | Jau et al. | |
| 10,541,809 B2 | 1/2020 | Godfrey et al. | |
| 10,564,933 B2* | 2/2020 | Nordholt | G06F 7/588 |
| 10,595,102 B2 | 3/2020 | Brodsky et al. | |
| 10,790,913 B2 | 9/2020 | Henningsen et al. | |
| 10,992,391 B1* | 4/2021 | Meyers | H04B 10/0799 |
| 11,193,750 B1 | 12/2021 | Fertig et al. | |
| 11,251,952 B2 | 2/2022 | Lamas-Linares et al. | |
| 11,268,806 B2 | 3/2022 | Fertig et al. | |
| 11,290,181 B1 | 3/2022 | Meyers et al. | |
| 11,367,014 B2 | 4/2022 | Vacon et al. | |
| 11,411,658 B1 | 8/2022 | Vacon et al. | |
| 11,431,418 B2 | 8/2022 | Rauschenbach et al. | |
| 11,507,874 B2 | 11/2022 | Vacon et al. | |
| 11,610,147 B2 | 3/2023 | Vacon et al. | |
| 11,614,771 B2 | 3/2023 | Vacon et al. | |
| 11,616,644 B2 | 3/2023 | Vacon et al. | |
| 11,728,902 B1 | 8/2023 | Meyers et al. | |
| 11,829,847 B2 | 11/2023 | Vacon et al. | |
| 2002/0191176 A1 | 12/2002 | Saleh et al. | |
| 2004/0095582 A1 | 5/2004 | Holbrook | |
| 2004/0208638 A1 | 10/2004 | Jansen | |
| 2004/0258421 A1 | 12/2004 | Conti et al. | |
| 2005/0100351 A1 | 5/2005 | Yuan et al. | |
| 2005/0135620 A1 | 6/2005 | Kastella et al. | |
| 2005/0199812 A1 | 9/2005 | Shih | |
| 2006/0115086 A1 | 6/2006 | Beausoleil et al. | |
| 2007/0101410 A1 | 5/2007 | Harrison et al. | |
| 2008/0059712 A1 | 3/2008 | Fedorova | |
| 2008/0180222 A1* | 7/2008 | Hollister | H04L 67/12 |
| | | | 340/10.3 |
| 2009/0147955 A1 | 6/2009 | Kim et al. | |
| 2009/0194702 A1 | 8/2009 | Meyers et al. | |
| 2009/0290162 A1 | 11/2009 | Erkmen et al. | |
| 2009/0316910 A1 | 12/2009 | Maeda et al. | |
| 2012/0051755 A1 | 3/2012 | Arahira | |
| 2012/0294625 A1 | 11/2012 | Dynes et al. | |
| 2013/0176573 A1 | 7/2013 | Bovino | |
| 2014/0112478 A1 | 4/2014 | Arahira | |
| 2015/0055961 A1 | 2/2015 | Meyers et al. | |
| 2016/0028544 A1* | 1/2016 | Hyde | H04L 9/0662 |
| | | | 711/112 |
| 2016/0041032 A1 | 2/2016 | Matthews et al. | |
| 2016/0112066 A1 | 4/2016 | Ashikhmin | |
| 2016/0164615 A1 | 6/2016 | Dailey et al. | |
| 2016/0191173 A1 | 6/2016 | Malaney | |
| 2016/0234017 A1 | 8/2016 | Englund et al. | |
| 2017/0099139 A1 | 4/2017 | Han et al. | |
| 2017/0364796 A1 | 12/2017 | Wiebe et al. | |
| 2018/0152295 A1 | 5/2018 | Drost et al. | |
| 2018/0232649 A1 | 8/2018 | Wiebe et al. | |
| 2018/0239592 A1* | 8/2018 | Nordholt | H04L 9/0852 |
| 2019/0103962 A1 | 4/2019 | Howe et al. | |
| 2019/0376820 A1 | 12/2019 | Jones et al. | |
| 2020/0044749 A1 | 2/2020 | Rauschenbach et al. | |
| 2020/0084033 A1 | 3/2020 | Lamas-Linares et al. | |
| 2020/0183250 A1 | 6/2020 | Hall et al. | |
| 2020/0233645 A1* | 7/2020 | Nordholt | G06F 7/588 |
| 2020/0274703 A1 | 8/2020 | Lukens et al. | |
| 2020/0313879 A1 | 10/2020 | Hong et al. | |
| 2020/0334101 A1 | 10/2020 | Albert et al. | |
| 2020/0350990 A1 | 11/2020 | Beattie, Jr. et al. | |
| 2020/0374211 A1 | 11/2020 | Griffin et al. | |
| 2020/0379171 A1 | 12/2020 | Li et al. | |
| 2020/0382219 A1 | 12/2020 | Innes et al. | |
| 2021/0105135 A1 | 4/2021 | Figueroa et al. | |
| 2021/0116639 A1 | 4/2021 | Fertig et al. | |
| 2021/0124640 A1 | 4/2021 | Nickerson et al. | |
| 2021/0132969 A1 | 5/2021 | Smith | |
| 2021/0133614 A1 | 5/2021 | Ashrafi | |
| 2021/0152346 A1 | 5/2021 | Bucklew et al. | |
| 2021/0273731 A1 | 9/2021 | Zhang et al. | |
| 2021/0295196 A1 | 9/2021 | Gimeno-Segovia | |
| 2021/0296558 A1 | 9/2021 | Englund et al. | |
| 2021/0325605 A1 | 10/2021 | Rudolph et al. | |
| 2022/0019409 A1* | 1/2022 | Bharadwaj | G06F 1/105 |
| 2022/0043128 A1 | 2/2022 | Pacala et al. | |
| 2022/0069152 A1 | 3/2022 | Tosi et al. | |
| 2022/0084085 A1 | 3/2022 | Rigetti et al. | |
| 2022/0085985 A1 | 3/2022 | Kaplan | |
| 2022/0114471 A1 | 4/2022 | Vacon et al. | |
| 2022/0214713 A1 | 7/2022 | Vacon et al. | |
| 2022/0309375 A1 | 9/2022 | Vacon et al. | |
| 2022/0353068 A1 | 11/2022 | Vacon et al. | |
| 2023/0058994 A1 | 2/2023 | Vacon et al. | |
| 2023/0177375 A1 | 6/2023 | Vacon et al. | |
| 2023/0185330 A1 | 6/2023 | Vacon | |
| 2023/0216670 A1 | 7/2023 | Vacon et al. | |
| 2023/0324527 A1 | 10/2023 | Vacon et al. | |
| 2023/0327778 A1 | 10/2023 | Vacon et al. | |
| 2023/0327779 A1 | 10/2023 | Vacon et al. | |
| 2023/0375327 A1 | 11/2023 | Vacon et al. | |

FOREIGN PATENT DOCUMENTS

| | | |
|---|---|---|
| EP | 3771137 A1 | 1/2021 |
| JP | 6060737 B2 | 1/2017 |
| JP | 6708062 B2 | 6/2020 |
| KR | 10-2021-0154364 A | 12/2021 |
| WO | 2020/140850 A1 | 7/2020 |
| WO | 2020/180672 A1 | 9/2020 |
| WO | 2020/232546 A1 | 11/2020 |
| WO | 2021/013990 A1 | 1/2021 |
| WO | 2021/171248 A1 | 9/2021 |
| WO | 2021/292322 A2 | 12/2021 |
| WO | 2022/140011 A2 | 6/2022 |
| WO | 2022/159902 A1 | 7/2022 |
| WO | 2023/196749 A1 | 10/2023 |
| WO | 2023/224658 A2 | 11/2023 |

(56) References Cited

FOREIGN PATENT DOCUMENTS

| WO | 2023/225456 A1 | 11/2023 |
|---|---|---|
| WO | 2024/006713 A1 | 1/2024 |

OTHER PUBLICATIONS

Rangrajan et al., "Optimizing type-I polarization-entangled photons", Optics Express, vol. 17, No. 21, Oct. 12, 2009, pp. 18920-18933.
Rarity et al.,"Single-photon counting for the 1300-1600-nm range by use of Peltier-cooled and passively quenched nGaAs avalanche photodiodes", Applied Optics, vol. 39, No. 36, Dec. 20, 2000, pp. 6746-6753.
Resch et al., "Distributing entanglement and single photons through an intra-city, free-space quantum channel", Optics Express, vol. 13, No. 1, Jan. 10, 2005, pp. 202-209.
Rizzi et al., "White Rabbit Clock Synchronization: Ultimate Limits on Close-In Phase Noise and Short-Term Stability Due to FPGA Implementation", IEEE Transactions on Ultrasonics, Ferroelectrics, and Frequency Control, vol. 65, No. 3, Sep. 2018, pp. 1726-1737.
Saleh et al., "Towards spontaneous parametric down conversion from monolayer MoS2", Scientific Reports, vol. 8, No. 3862, 2018, 7 pages.
Seijo et al., "Enhanced Timestamping Method for Sub-Nanosecond Time Synchronization in IEEE 802.11 over WLAN Standard Conditions", IEEE Transactions on Industrial Informatics, vol. 16, No. 9, Sep. 2020, pp. 5792-5805.
Shapiro et al., "On-demand single-photon generation using a modular array of parametric downconverters with electro-optic polarization controls," Opt. Lett., vol. 32, 2007, 2698-2700.
Shen et al., "Classically Entangled Vectorial Structured Light towards Multiple Degrees of Freedom and Higher Dimensions", STh1B.1, CLEO 2021, 2 pages.
Shi et al., "Privacy-preserving Quantum Sealed-bid Auction Based on Grover's Search Algorithm", Scientific Reports, vol. 9, 2019, pp. 1-10.
Shi et al., "Breakdown flash at telecom wavelengths in InGaAs avalanche photodiodes", Optics Express, vol. 25, No. 24, Nov. 27, 2017, pp. 30388-30394.
Shrivastav et al., "Globally Synchronized Time via Datacenter Networks", IEEE/ACM Transactions On Networking, Aug. 2019, vol. 27, No. 4, Aug. 2019, pp. 1401-1416.
Simon et al., "High-capacity quantum key distribution via hyperentangled degrees of freedom", New Journal of Physics, vol. 16, Jun. 24, 2014, 21 pages.
Sloan et al., "Two photon emission from superluminal and accelerating index changes", FM3N.4, CLEO 2021, 2 pages.
Smith et al., "Quantifying Coherence and Entanglement via Simple Measurements", arXiv:1707.09928v1, Jul. 31, 2017, 9 pages.
Stipcevic, Mario, "Quantum random number generators and their applications in cryptography", Proc. of SPIE, vol. 8375, 2012, pp. 837504-1-837504-15.
Strekalov et al., "Postselection-free energy-time entanglement", Physical Review A, Third Series, vol. 54, No. 1, Jul. 1996, pp. R1-R4.
Sulimany et al., "All-Fiber Source and Sorter for Multimode Correlated Photons", JTh3A.17, CLEO 2021, 2 pages.
Suprano et al., "Detection techniques for Orbital Angular Momentum states", JTh3A.59, CLEO 2021, 2 pages.
Time in distributed systems, University of Cambridge, Cambridge, UK, 20 pages.
Time in distributed systems: clocks and ordering of events, Indian Institute of Technology Kharagpur, Department of computer Science and Engineering, 38 pages.
Tittel et al., Long-distance Bell-type tests using energy-time entangled photons, University of Geneva, Group of Applied Physics, 20,Rue de l'Ecole de Medecine, CH-1211 Geneva 4, Switzerland, Nov. 4, 2018, pp. 1-22.

Treiber et al., "A fully automated entanglement-based quantum cryptography system for telecom fiber networks", New Journal of Physics, vol. 11, Apr. 30, 2009, 20 pages.
Unternahrer et al., "Coincidence detection of spatially correlated photon pairs with a monolithic time-resolving detector array", Optics Express, vol. 24, No. 15, Dec. 12, 2016, pp. 28829-28841.
Unternahrer et al.,"Coincidence Detection of Spatially Correlated Photon Pairs with a Novel Type of Monolithic time-Resolving Detector Array", IEEE, 2017, 1 page.
Ursin et al. "Entanglement-based quantum communication over 144 km", Nature Physics, vol. 3, Jul. 2007, pp. 481-486.
Ursin et al., "Quantum teleportation across the Danube", Nature, vol. 430, Aug. 19, 2004, pp. 849.
Venkatasubramanian, Nalini, "Time in distributed Systems", 66 pages.
Wang, et al., "On-Demand Semiconductor Source of Entangled Photons Which Simultaneously Has High Fidelity, Efficiency, and Indistinguishability", Physical Review Letters, vol. 122, 113602, 2019, 6 pages.
Weihs et al., "Violation of Bell's inequality under strict Einstein locality conditions", Physical Review Letters, vol. 81, No. 23, Dec. 7, 1998, pp. 5039-5043.
Wengerowskya et al., Entanglement distribution over a 96-km-long submarine optical fiber, PNAS, vol. 116, No. 14, Apr. 2, 2019, pp. 684-6688.
Wittje, Roland, "Noise: From nuisance to research subject", Physics Today 73, Feb. 2020, 8 pages.
Xie et al., "A High-Precision 2.5-ps RMS Time Synchronization for Multiple High-Speed Transceivers in FPGA", IEEE Transactions On Nuclear Science, vol. 66, No. 7, Jul. 2019, pp. 1070-1075.
Zhang et al., "Examples on quantum search algorithm with optimized depth", Dec. 11, 2019, pp. 1-7.
Zhao et al., "Experimental Demonstration of Five-photon Entanglement and Open-destination Teleportation", Nature, vol. 430, Jul. 2004, 19 pages.
Zhuang et al., "Entanglement-Enhanced Lidars for Simultaneous Range and Velocity Measurements." Physical Review A, vol. 96, No. 4, Oct. 2017, pp. 040304-1-040304-6.
Zielnicki, Kevin, "Pure Sources And Efficient Detectors For Optical Quantum Information Processing", 2014, 104 pages.
Hu et al., "Beating the channel capacity limit for superdense coding with entangled ququarts", Science Advances, vol. 4 , Jul. 20, 2018, pp. 1-5.
International Preliminary Report on Patentability received for corresponding PCT Patent Application No. PCT/US2021/060655, dated Jun. 8, 2023, 8 pages.
International Search Report and Written Opinion received for corresponding PCT Patent Application No. PCT/US2021/060655, dated Aug. 18, 2022, 9 pages.
Jennewein et al., "Quantum Cryptography with Entangled Photons", Physical Review Letters, vol. 84, No. 20, May 15, 2000, pp. 4729-4732.
Joly et al., "Fibre-based pressure-controlled sources for quantum optics", STh1A.5, CLEO 2021, 2 pages.
Jozsa et al., "Quantum Clock Synchronization Based on Shared Prior Entanglement", Physical Review Letters, vol. 85, No. 9, Aug. 28, 2000, pp. 2010-2013.
Jung et al., "Remote Laser-Microwave Synchronization Over Kilometer-Scale Fiber Link With Few-Femtosecond Drift" Journal of Lightwave Technology, vol. 32, No. 20, Oct. 15, 2014, pp. 3742-3748.
Kaczmarek et al., "A Noiseless Quantum Optical Memory at Room Temperature", Frontiers in Optics, 2017, 2 pages.
Kanamori et al., "Three-party Quantum Authenticated Key Distribution with Partially Trusted Third Party", IEEE Global Telecommunications Conference, IEEE, 2008, 5 pages.
Kaneda et al., "Heralded single-photon source utilizing highly nondegenerate, spectrally factorable spontaneous parametric downconversion", Optics Express, vol. 24, No. 10, May 16, 2016, pp. 10733-10747.
Karlsson et al., "Quantum teleportation using three-particle entanglement", Physical Review A, vol. 58, No. 6, Dec. 1998, pp. 4394-4400.

(56) References Cited

OTHER PUBLICATIONS

Kashi et al., "Enabling Scalability of Photonic Frequency-Domain Quantum Processing", FM1N.4, CLEO 2021, 2 pages.
Kavuri et al., "Quantum state tomography at the Tsirelson bound", JTu3A.45, CLEO 2021, 2 pages.
Kemparaj et al., "Secure precision time protocol in packet switched networks", IEEE, 2019, 6 pages.
Kiesel et al., "Experimental Analysis of a Four-Qubit Photon Cluster State", Physical Review Letters, vol. 95, 210502, Nov. 18, 2005, pp. 1-4.
Kim et al., "Delayed "Choice" Quantum Eraser", Physical Review Letters, vol. 84, No. 1, Jan. 3, 2000, 5 pages.
Kong et al., "Implementation of Multiparty quantum clock synchronization", arXiv:1708.06050v2, 2017, 6 pages.
Kviatkovsky et al., "Microscopy with undetected photons in the mid-infrared", FTh2O.5, CLEO 2021, 2 pages.
Kwiat et al., "New High-Intensity Source of Polarization-Entangled Photon Pairs", Physical Review Letters, vol. 75, No. 24, Dec. 11, 1995, pp. 4337-4341.
Lee et al., "Temporal Multiplexing of Heralded Single Photon Sources Using Optical Fiber Delays", Korea Institute of Science and Technology Information—Korea Research Institute of Standards and Science, 2020, 3 pages.
Lee, Catherine, "High-Dimensional Quantum Communication Deployed Fiber", Feb. 2018, 143 pages.
Lesovik et al., "Arrow of time and its reversal on the IBM quantum computer", Scientific Reports, 2019, vol. 9, No. 4396, 2019, 8 pages.
Leung et al., "Deterministic bidirectional communication and remote entanglement generation between superconducting qubits", npj Quantum Information, vol. 5, 2019, 5 pages.
Li et al., "Quantum Supremacy Circuit Simulation on Sunway TaihuLight", URL:https://arxiv.org/pdf/1804.04797.pdf, Aug. 13, 2018, pp. 1-11.
Liu et al., "General scheme for superdense coding between multiparties", Physical Review A, vol. 65, 2002, pp. 022304-1-022304-4.
Ilic, Nikolina, "The Ekert Protocol", Journal of Physics, 334, Jul. 22, 2007, 4 pages.
Ilo-Okeke et al., "Remote quantum clock synchronization without synchronized clocks", Npj Quantum Information, 2018, 5 pages.
Lloyd et al., "Long Distance, Unconditional Teleportation of Atomic States via Complete Bell State Measurements", Physical Review Letters, vol. 87, No. 16, Oct. 15, 2001, pp. 167903-1-167903-4.
Luo et al., "High-Reliability Sub-Nanosecond Network Time Synchronization Method Enabled by Double-Frequency Distributed Time Synchronization", Journal of Optical Communications and Networking, vol. 11, No. 1, Jan. 2019, pp. A40-A51.
Mahmood et al., "Delay and Jitter Characterization for Software-Based Clock Synchronization Over WLAN Using PTP", IEEE Transactions on Industrial Informatics, vol. 10, No. 2, May 2014, pp. 1198-1206.
Mandel, L., "Proposal for almost noise-free optical communication under conditions of high background", J. Opt. Soc. Am. B, vol. 1, No. 1, Mar. 1984, pp. 108-110.
Martin et al., "Quantifying Photonic High-Dimensional Entanglement", vol. 118, issue 11, Mar. 17, 2017, pp. 110501-1-110501-5.
Matsukevich et al., "Bell Inequality Violation with Two Remote Atomic Qubits", Physical Review Letters, vol. 100, Apr. 18, 2008, pp. 150404-1-150404-4.
Mattle et al., "Dense Coding in Experimental Quantum Communication", Physical Review Letters, vol. 76, No. 25, Jun. 17, 1996, pp. 4656-4659.
Merkouche et al., "Multiple pulse-mode Bell states heralded via entanglement swapping", JM4E.6, CLEO 2021, 2 pages.
Meyer-Scott et al., "Single-photon sources: Approaching the ideal through multiplexing", Review of Scientific Instruments, 2020, vol. 91, No. 4, 2020, pp. 041101-1-041101-18.
Mkacher et al., "Calibrating NTP", IEEE, 2019, 6 pages.
Morrison et al., "High dimensional frequency-bin entanglement from domain engineered parametric downconversion", FM1N.1, CLEO, 2021, 2 pages.
Muller, et al., "On-demand generation of indistinguishable polarization-entangled photon pairs," URL: https://arxiv.org/ftp/arxiv/papers/1308/1308.4257.pdf, Aug. 21, 2013, 5 pages.
Nolleke et al., "Efficient Teleportation Between Remote Single-Atom Quantum Memories", Physical Review Letters, vol. 110, Apr. 5, 2013, pp. 140403-1-140403-5.
Nunn et al., "Enhancing multiphoton rates with quantum memories", Centre for Quantum Technologies, Sep. 9, 2018, 5 pages.
Oh, J., et al., "Coincidence Rates for Photon Pairs in WDM Environment", Journal of Lightwave Technology, vol. 29, No. 3, Feb. 1, 2011, pp. 324-329.
Paesani et al., "Generation and sampling of quantum states of light in a silicon chip", Nature Physics, 2018, 27 pages.
Pant et al., Routing entanglement in the quantum internet', arXiv:1708.07142v2, Sep. 22, 2017, 13 pages.
Park et al.,"High-performance reconfigurable coincidence counting unit based on a field programmable gate array", Applied Optics, vol. 54, No. 15, May 20, 2015, pp. 4727-4731.
Peloso et al., "Daylight operation of a free space, entanglement-based quantum key distribution system", New Journal of Physics 11, 2009, 13 pages.
Pfaff et al., "Unconditional quantum teleportation between distant solid-state quantum bits", Quantum Information, vol. 345, No. 6196, Aug. 1, 2014, pp. 532-535.
Piqoquant GMBH, "Using coincidence correlation for studying quantum optic systems", Jun. 1, 2018, 6 pages.
Placke et al., "Engineering AlGaAs-on-insulator towards quantum optical applications", JTu3A.20, CLEO 2021, 2 pages.
Quan et al., "Demonstration of quantum synchronization based on second-order quantum coherence of entangled photons", Scientific Reports, vol. 6, 2016, pp. 1-8.
Agam et al., "Shot Noise In Chaotic Systems: "Classical" to Quantum Crossover", Physical Review Letters, vol. 85, No. 15, Oct. 9, 2000, pp. 3153-3156.
Altepeter et al., "Phase-compensated ultra-bright source of entangled photons", Optics Express, vol. 13, No. 22, Oct. 31, 2000, pp. 8951-8959.
Anderson, Brian P., "Field Guide to Quantum Mechanics", SPIE Field Guides, vol. FG44, 2019, 152 pages.
Arrazola et al., "Quantum Fingerprinting with Coherent States and a Constant Mean Number of Photons", Physical Review A 89, 2014, pp. 062305-1-062305-6.
Aull et al., "Geiger-Mode Avalanche Pholodiodes for Three-Dimensional Imaging", Lincoln Laboratory Journal, vol. 13, No. 2, 2002, pp. 335-350.
Avalanche Pholodiodes: A User's Guide, PerkinElmer, 2003, 8 pages.
Ball et al., "Quantum firmware and the quantum computing stack", Physics Today, vol. 74, No. 3, Mar. 2021, pp. 28-34.
Bedington et al., "Progress in satellite quantum key distribution", Quantum Information, vol. 3, 2017, pp. 1-13.
Bennett et al., "Entanglement-Assisted Classical Capacity of Noisy Quantum Channels", Physical Review Letters, vol. 83, No. 15, Oct. 11, 1999, pp. 3081-3084.
Bennett et al., "Purification of Noisy Entanglement and Faithful Teleportation via Noisy Channels", vol. 76, No. 5, Jan. 29, 1996, pp. 722-725.
Bennett et al., "Quantum cryptography: Public key distribution and coin tossing", Theoretical Computer Science, vol. 560, 2014, pp. 7-11.
Bennett et al., "Teleporting an Unknown Quantum State via Dual Classical and Einstein-Podolsky-Rosen Channels", Physical Review Letters, vol. 70, No. 13, Mar. 29, 1993, pp. 1895-1899.
Bhandari et al., "Low-Cost Coincidence-Counting Electronics for Quantum Optics", Department of Physics, 2007, 2 pages.
Boso et al., "Low-cost and compact single-photon counter based on a CMOS SPAD smart pixel", IEEE Photonics Technology Letters, vol. 27, No. 23, Dec. 1, 2015, 4 pages.
Boughn, Stephen, "Making Sense of Bell's Theorem and Quantum Nonlocality", Found Physics, 2017, 18 pages.

(56) References Cited

OTHER PUBLICATIONS

Brunner et al., "Bell nonlocality", Reviews of Modern Physics, vol. 86, 2014, pp. 419-478.
Brunner et al., "Detection loophole in asymmetric Bell experiments", PRL, Vo. 98, 220403, 2007, pp. 220403-1-220403-4.
Butner et al., "Nanosecond-scale Event Synchronization over Local-area Networks", Proceedings of the 27th Annual IEEE Conference on Local Computer Networks, 2021, 9 pages.
Chang et al., "Quantification of High-dimensional Energy-time Entanglement in a Biphoton Frequency Comb", FM3M.6, CLEO 2021, 2 pages.
Chapman et al., "Hyperentangled Time-bin and Polarization Quantum Key Distribution", arXiv:1908.09018v3, 2020, 39 pages.
Chen et al., "Heralded Quantum Random Access Memory in a Scalable Photonic Integrated Circuit Platform", Optical Society of America, 2021, 2 pages.
Chen et al., "Joint Time and Frequency Dissemination Network Over Delay-Stabilized Fiber Optic Links", IEEE Photonics Journal, vol. 7, No. 3, Jun. 2015, 10 pages.
Chen et al., Experimental demonstration of conjugate-Franson interferometry, Research Laboratory of Electronics, Massachusetts Institute of Technology, Cambridge, MA 02139 ,USA, May 3, 2021, pp. 1-7.
Chen et al., Supplemental Material for Experimental Demonstration of Conjugate Franson Interferometry, Research Laboratory of Electronics, Massachusetts Institute of Technology, Cambridge, MA 02139, May 3, 2021, pp. 1-4.
Cho, et al., "Highly efficient optical quantum memory with long coherence time in cold atoms", Optica, vol. 3, No. 1, Jan. 15, 2016, pp. 100-107.
Clemmen et al., "All-optically tunable buffer for single photons", Optics Letters, vol. 43, No. 9, Apr. 27, 2018, pp. 2138-2141.
D'Ambrosio et al., "Complete experimental toolbox for alignment-free quantum communication", Nature communications, vol. 3, 2012, 8 pages.
Das et al., "Robust quantum network architectures and topologies for entanglement distribution", Physical Review A 97, 2018, pp. 012335-1-012335-12.
Demirel et al., "Correlations for computation and computation for correlations", Nature Partner Journals, vol. 7, 2021, pp. 1-8.
Devetak et al., "Distillation of secret key and entanglement from quantum states", Proceedings of the Royal Society A, vol. 461, 2004, pp. 207-235.
Ding et al., "The Cross-Correlation of Binary Sequences With Optimal Autocorrelation", IEEE Transactions On Information Theory, 2010, vol. 56, No. 4, Apr. 2010, pp. 1694-1701.
Ekert,Artur K., "Quantum Cryptography Based on Bell's Theorem", Physical Review Letters, vol. 67, No. 6, Aug. 5, 1991, pp. 661-663.
Fanto et al., "Multipli-entangled photons from a spontaneous parametric downconversion source", Quantum Information and Computation, vol. 8057, 2011, pp. 805705-1-805705-12.
Galvez, Eenrique J., "Correlated-Photon Experiments Laboratory Manual", Colgate University, 2008, 27 pages.
Gentry et al., "Quantum-correlated photon pairs generated in a commercial 45 nm complementary metal-oxide semiconductor microelectronic chip", Optica, vol. 2, No. 12, Dec. 2015, pp. 1065-1071.
Giovannetti et al., "Limits to clock synchronization induced by completely dephasing communication channels", Physical Review A, Jun. 17, 2002, vol. 65, 062319-1-062319-6.
Giovannetti et al., "Quantum-enhanced positioning and clock synchronization", Nature, vol. 412, Jul. 26, 2001, 16 pages.
Gisin, Nicolas, "Entanglement 25 Years after Quantum Teleportation: Testing Joint Measurements in Quantum Networks", Entropy, vol. 21, 2019, pp. 1-12.
Gogo et al., "Comparing quantum and classical correlations in a quantum eraser", Physical Review A, vol. 71, 2005, pp. 052103-1-052103-6.
Goswami et al., "Indefinite causal order in a quantum switch", Physical Review Letters, vol. 121, 2018, pp. 090503-1-090503-5.
Goswami, Abhirup, "Analysis of a Deterministic Entangled Photon Pair Source using Single Photons", Sep. 2016, 79 pages.
Grieve et al.,"Correcting for accidental correlations in saturated avalanche photodiodes", Optics Express, vol. 24, No. 4, Feb. 22, 2016, pp. 3592-3600.
Guccione et al., "Connecting heterogeneous quantum networks by hybrid entanglement swapping", Sci. Adv., vol. 6, No. 22, 2020, pp. 1-6.
Guo et al.,"Tesling the Bell inequality on frequency-bin entangled photon pairs using lime-resolved detection", Optica, vol. 4, No. 4, Apr. 2017, pp. 388-392.
Haider et al., "Entangling Independent Photons by Time Measurement", Nature Physics, vol. 3, Oct. 2007, pp. 692-695.
Hamel et al., "Direct generation of three-photon polarization entanglement", Nature Photonics, vol. 8, Sep. 14, 2014, pp. 801-807.
Haroche, Serge, "Entanglement, Decoherence And The Quantum/Classical Boundary", Physics Today, vol. 51, Jul. 1998, pp. 36-42.
Heshami et al., "Quantum memories: Emerging Applications and Recent Advances," Journal of modern optics, vol. 63, No. 20, 2016, pp. 2005-2028.
Hong et al., "Measurement of Subpicosecond Time Intervals between Two Photons by Interference," Physical Review Letters, vol. 59, No. 18, 2044, Nov. 2, 1987, pp. 1-3.
Hong et al., "Optical communication channel based on coincident photon pairs", Applied Optics, vol. 24, No. 22, Nov. 15, 1985, pp. 3877-3882.
Achatz et al., "High-dimensional EPR entanglement from a SPDC source at telecom wavelength", arXiv: Quantum Physics, 2021, pp. 1-7.
Bauerle et al. "Coherent control of single electrons: a review of current progress", Rep. Prog. Phys., vol. 81, 056503, Apr. 5, 2018, 33 pages.
Erkmen et al.,"Ghost imaging: from quantum to classical to computational", Advances in Optics and Photonics,vol. 2, 2010, pp. 405-450.
International Search Report and Written Opinion received for corresponding PCT Application No. PCT/US2023/069109, dated Oct. 6, 2023, 11 pages.
Jin et al., "Long-range distribution of high-quality time-bin entangled photons for quantum communication", Journal of the Korean Physical Society, vol. 80, Dec. 2021, pp. 203-213.
Shapiro et al., "Classical Imaging with Undetected Photons" Scientific Reports, vol. 5, No. 10329, 2015, pp. 1-8.
Using coincidence correlation for studying quantum optic systems, Piqoquant GMBH. Jun. 1, 2018, 6 pages.

* cited by examiner

SYSTEM AND METHOD OF VERIFICATION, AUTHENTICATION, AND/OR CERTIFICATION USING ENTANGLED PHOTONS

CROSS REFERENCE TO RELATED APPLICATION

The present application claims benefit of U.S. Provisional Patent Application Ser. No. 63/356,975, entitled "System and Method of Verification, Authentication, and/or Certification using Entangled Photons", filed on Jun. 29, 2022, and is a continuation-in-part of U.S. patent application Ser. No. 18/174,636, entitled "Receiver for Verification using Entangled Photons", filed on Feb. 26, 2023, which is a continuation of U.S. patent application Ser. No. 17/852,758, entitled "System and Method of Verification and Authentication using Entangled Photons", filed on Jun. 29, 2022, now granted as U.S. Pat. No. 11,616,644 on Mar. 28, 2023, which is a continuation-in-part of U.S. patent application Ser. No. 17/465,235, entitled "Method for Synchronizing and Locking Clocks", filed on Sep. 2, 2021, now patented as U.S. Pat. No. 11,614,771 on Mar. 28, 2023, which is a non-provisional application of U.S. Provisional Patent Application Ser. No. 63/118,542, filed on Nov. 25, 2020, entitled "System and Method for Sharing Quantum Entanglement", and is a non-provisional application of U.S. Provisional Patent Application No. 63/186,754, entitled "System and Method for Sharing Quantum Entanglement", filed on May 10, 2021, and is a non-provisional application of U.S. Provisional Patent Application No. 63/218,433, entitled "System and Method for Sharing Quantum Entanglement", filed on Jul. 5, 2021. U.S. patent application Ser. No. 17/852,758 also claims benefit of U.S. Provisional Patent Application Ser. No. 63/356,534, entitled "System and Method of Verification and Authentication Using Entangled Photons", filed on Jun. 29, 2022. The entire contents of U.S. patent application Ser. Nos. 18/174,636, 17/852,758 and 17/465,235, and U.S. Provisional Patent Application Nos. 63/118,542, 63/186,754, 63/218,433, 63/356,534 and 63/356,975 are herein incorporated by reference.

The section headings used herein are for organizational purposes only and should not to be construed as limiting the subject matter described in the present application in any way.

INTRODUCTION

Entanglement is a valuable quantum resource that allows information to be shared between different users with properties that are not possible with classical sharing schemes. Methods and systems that support and improve the distribution and use of entangled quantum resources for various applications are and will be useful in advancing art.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

DESCRIPTION OF VARIOUS EMBODIMENTS

Figure 1:
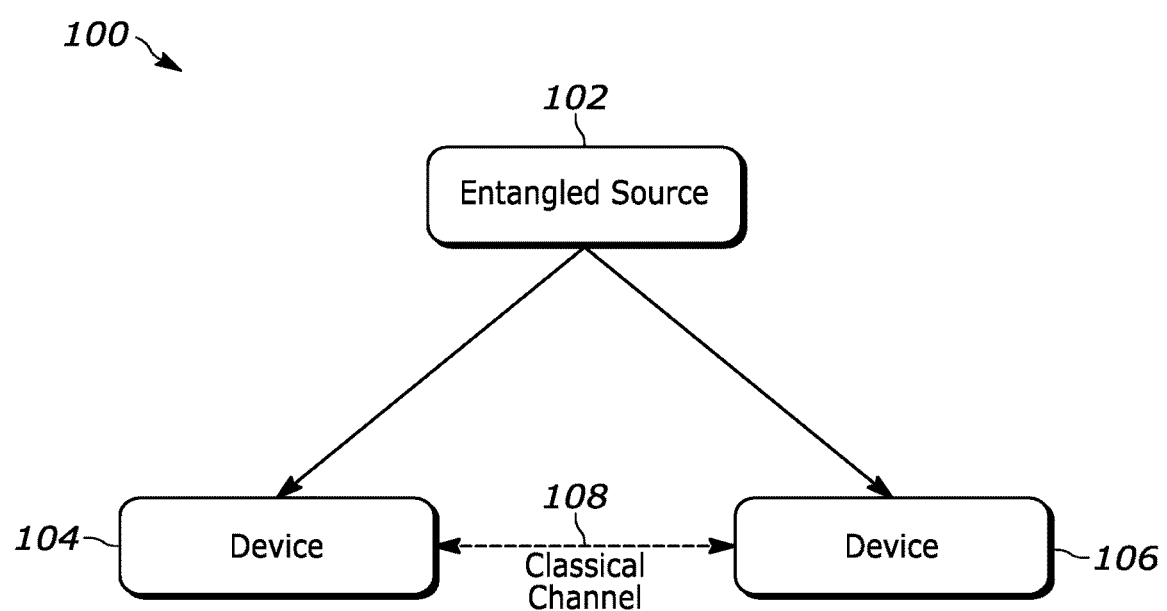
FIG. 1 illustrates an embodiment of an authentication and verification system and method using entangled photons of the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Entanglement is a resource that can be used in a variety of quantum and/or classical systems. Entanglement refers to a quantum system that shares quantum state information such that measurements of the system, even if performed at different times and/or places yields measured quantum states that are perfectly correlated.

One feature of the present teaching is that it supports the use of so-called "high brightness" single-photon sources to generate quantum entangled photon pairs that are shared. Some of these high-brightness sources create large numbers of quantum entangled pairs using Spontaneous Parametric Down Conversion (SPDC). These systems are optically pumped crystals with a laser source. The crystals emit photons that are entangled in one or more basis which may include polarization, frequency (color), space, and/or time. Photons that are entangled in more than one basis can be referred to as carrying a hyperentangled state. In this case, two or more different measured state values are correlated across the pair of entangled photons. Thus, the state of the photon emitted in this multi-dimensional quantum state can be measured and represented as having a time, a position, a frequency and/or a polarization. In various embodiments, numerous subsets of the possible states are generated, measured, formulated as a comb and/or shared as a comb. This can be a time-bin comb representation and/or a timestamp comb representation.

A comb is a list of values of selected measured states. Said another way, a comb is an ordered list of measurement events. In some embodiments, a comb is a list of measured states in the order they arrive at a measurement node and/or at a particular detector or group of detectors in the measurement node. In some embodiments, a comb is a list of measured states in an order they are measured. In some embodiments a comb is a list of measured states and/or the time of arrival (TOA). In some embodiments, a comb is an ordered list of measured events from different spatial positions. In other embodiments, a comb is an ordered list of measured events from different polarizations. In other embodiments, a comb is an ordered list of measured events from different colors. In yet other embodiments, a comb is a combination of measured events that may include any combination of the above and any other type measured events.

The comb time can be measured from various reference points in various embodiments. In some embodiments, the come time is measured using a local clock. In some embodiments, the local clock is synchronized in a relative and/or absolute basis to a non-local clock using systems and methods known by those skilled in the art. In some embodiments, the clocks are free running clocks that are synchronized using shared entanglement. In some embodiments, a comb includes more than one value per measured state. The value can be, for example, polarization, arrival time, frequency/color and/or spatial position. This is the case, for example, if an entangled state is a hyper-entangled state, where a single photon of a pair or set is entangled in more than one way (dimension or basis). In some embodiments, different members of a comb have different values. That is, a comb can include more than one type of entangled state where the more than one types are not entangled with each other. This could be the case, for example, if quantum states from two different sources generating entangled states were multiplexed. This could be done, for example, to increase the rate of entangled pairs being generated.

In SPDC sources, the time entanglement occurs as photons created by this process are "born" at the same moment in time with absolute precision ($\Delta t=0$), although the actual birth time is a random process and unknown and thus satisfies the superposition requirement for being quantum entangled.

The frequency, which can also be referred to in the art as color or wavelength, entanglement occurs due to the conservation of energy. For photons, $E=h\nu$ where h is Planck's constant and v is the frequency. The energy in the laser pump photons (frequency/color) determines what frequencies are available to the entangled photons that are generated by the process. However, any given pair of generated photons can be in any allowed combination and thus the particular color is unknown at the source, satisfying the conditions for being quantum entangled. As one example, for frequency entanglement, if VL is the frequency of the pump and Vi is the frequency of the idler photon, and Vs is the frequency of the signal photon, then: $E=hVL=hVi+hVs$, or $E/h=VL=Vi+Vs$.

Polarization entanglement can be realized by using two crystals back-to-back with a length that is less than a coherence length of the pump source. Each crystal is configured to generate a particular polarization state of the output based on an input polarization of the pump. However, it is unknown at the output of the back-to-back crystals which crystal generated the pair, and thus what polarization state of a given pair is unknown at the source, satisfying the conditions for pairs being quantum entangled in polarization.

Spatial entanglement is realized by relying on conservation of momentum. In general, there can be multiple spatial directions along which pairs are provided that is based on the birefringent properties of the crystal. In these configurations, a particular one of two, or one of a continuous spatial region (e.g. a cone-shaped region) of a position of a particular pair is unknown at exit to the crystal. This then satisfies the conditions for pairs being quantum entangled in space. The spatial entanglement could be, for example, one of two positions, but it could also be entangled in more dimensions and up to a continuous set of dimensions.

A feature of the temporal and spatial bases, therefore, is that the amount of information of a particular measurement can be substantially higher than the amount of information in a basis of entanglement that is a "one of two" possibilities basis. Generally, depending on a particular basis type of the entanglement, the measurement can represent an outcome that is one of two, sometimes referred to as a qubit configuration, one of three, one of four, etc. up to a full continuum of values. It should be understood that the information within a continuum of values is only limited by the resolution of the measurement apparatus. We refer herein to the extent or number of possible measurement outcomes of a particular basis as the "state dimension" of the basis. It should be understood that the term "state dimension" is different from the term "dimension", which is also used herein as applied to entanglement. In the art the term "dimension" is sometimes another word for the term "basis". The usage is clear from the context of the discussion of the present teaching. One skilled in the art will appreciate that the quantum literature uses these various terms interchangeably.

Continuous values as part of an entanglement measurement are practically limited by the measurement resolution available for measuring that basis' dimensions. Entanglement basis types that provide a continuous set of values (continuous state dimension) are sometimes referred to as a continuous variable configuration. As described herein, both countable and continuous entangled dimensions are amenable to using the system and method of measurement comb sharing of the present teaching. Each type of basis provides various and sometimes different benefits, e.g. noise and/or background immunity, within a particular embodiment of a system and method of entanglement sharing that uses state combs of the present teaching.

One feature of the present teaching is that systems and methods of authentication and verification using entanglement can rely on entangled photons that are hyperentangled in time and polarization. We note that in the art, the terms "authentication", "verification" and "certification" are sometimes used interchangeably. For purposes of this disclosure, the term "verification" generally refers to a process that verifies an identity and/or an accuracy of data and/or the source of the data. The term "authentication" generally refers to the identification of and accuracy (e.g. trustworthiness) of a user and/or a role of a user connected to the generation of data. The data can include, for example, credit card numbers, prices, product codes, transaction data, and/or sensor data. Users can include individuals, but also may refer to a data generating device, for example, a robot, sensor or a terminal, which can have a role and/or identity as part of a system. The term "certification" is generally used for embodiments of the method and system that verify and follow a credential through a chain of use of that credential. However, one skilled in the art will appreciate that the terms "certification", "verification", and "authentication" are used in many different ways in this and related arts, and that the present teaching is not limited particular definitions of these terms in the literature.

FIG. 1 illustrates an embodiment of an authentication and verification system 100 and method using entangled photons of the present teaching. An entangled source 102 generates pairs of entangled photons. One of the pair is sent to a device 104. The device 104 can be a handheld device, for example, a cell phone or other personal device. The other of the pair is sent to another device 106. The other device 106 can be, for example, an authentication terminal, a point-of-sale terminal, a system server, or numerous other processing devices. The device 104 and the device 106 are connected via a classical communication channel 108. The entangled source 102 delivers entangled photons to a device 104 and the other device 106. The device 104 can be, as just some examples, a cell phone, tablet, watch, card, personal locator, sensor and/or specialized processor. The other device 106 can be, as just some examples, a point-of-sale (POS) terminal, a computer, a laptop and/or any of a number of fixed or handheld processing devices.

The devices 104, 106 can be connected to users that need authentication and verification services that connect, stamp, notate, mark, or otherwise associate information transfer(s) between the two devices 104, 106. In one embodiment of the authentication and verification system 100 the device 104 is a handheld device and the other device 106 is an authentication terminal. But this is just one example. For example, and as understood by those skilled in the art, either of handheld device and/or the authentication terminal can be any of numerous elements that form two sides of an authentication or verification system. That could include, numerous fixed or mobile assets, for example, sensor devices, robots, various pieces of equipment, and/or various computing and processing systems.

The device 104 and the other device 106 measure the photons generated by the source 102 in at least two bases. In some embodiments, the bases can be polarization and time. In some embodiments, the bases can be position and time. In some embodiments, the bases can be position and polarization. A measurement comb that includes measurements of one of the bases is exchanged over the classical channel 108. Most of the examples presented herein use a comb that is a time-based comb, but in general a comb is an ordered list of measurement events and is not necessarily time-based. So, for example, a position and polarization measurement comb can be a list ordered by specific positions and the value of polarization associated with that position. Position measurement alone can be an ordered list based on the order of position. Position measurement alone can also be an ordered list based on the measured position value in a time order based on when the position is measured. What is characteristic of the operation of the method and system of the present teaching is that combs generated in two separate measurements, one for each of the pair of entangled photons, and associated background measurements are prepared with the same ordering scheme to support the efficient matching and pair identification using the two combs.

The classical channel 108 in some embodiments is a Bluetooth™ channel. Both the device 104 and other device 106 determine a match in the measurement comb. This can be achieved using for example, by cross-correlation or a process of offset and matching of the basis information that has been exchanged. The match information is used by both the device 104 and the other device 106 to determine which measured photon events are entangled. Those photons values, measured in the other basis become a shared secret held between the device 104 and the other device 106. That shared secret can be used as a one-time pad, cryptographic key, and/or a transaction identification number.

In some embodiments, the entangled source 102 generates photons at an output such that the device 104 needs to be placed by the consumer in a specific location. For example, the entangled source 102, might generate entangled photons that illuminate a small region in space, and the analyzer and/or detectors in the device 104 must be within the illuminated area. In some embodiments, the entangled source 102 generates photons that are spread over a larger area, and the device 104 can be placed within the larger area. In some embodiments, the entangled source 102 generates photons that are coupled into one end of an optical fiber and the device 104 is configured to plug into the other end of the optical fiber.

In some embodiments, the entangled source 102 generates photons that are entangled in more than two bases. The third basis is also measured by the devices 104, 106 and associated with the time of arrival. In some embodiments, the measurements of the values of the third basis are used to generate more bits of random number that can be used as a verification code. For example, a two-dimensional basis will yield one bit per measurement (a zero or a one, for H or V). An extra basis can add the additional dimension of that basis for each entangled pair. For example, three colors and two polarization provide five bits, so the values are coded as one of one through five values for each number. The third basis measurements can also be used as an error check. If a value of the one basis is measured to produce a random number value, but a value of the third basis is not available at that time of arrival, then an error condition can be raised.

The verification code can be used in numerous ways. For example, the verification code can be attached to a purchase by both the owner of the other device 106 and the owner of the device 104, as a unique identifier of the purchase. The verification code can be used as a crypto key for securely transmitting a credit card number of the user of the device 104, that can be decoded only by the owner of the device 106 to secure the card for only the particular transaction. Two verification codes can be used for both purposes on a single transaction. The verification code can be attached to transaction data associated with transaction between the devices 104, 106, thereby verifying the transaction. The verification code can be used by a sensor (e.g. device 104) when sending sensor data to a server (e.g. device 104) to uniquely identify the received data as being from a particular sensor. The verification code generated in one device 104 can be XORed with data in that device 104 to generate secret data (scrambled) and then the secret data subsequently XORed with a verification code generated in the other device 106 to regenerate the data (unscramble) if the two verification codes are derived from entangled pairs.

The verification code can also be used to authenticate a user of a device 104 or the device 104 itself. In some embodiments, the verification code is sent to a trusted authority that holds the verification code in a repository (not shown). In a subsequent transaction with device 104 that can be with the device 106 or with a completely different device (not shown), the transacting device 106 can query the repository, for example, but having the device 104 resend the verification code to the repository to determine if it matches, and the repository sends back an authentication if the sent verification code matches the stored verification code. This serves to authenticate a user of the device 104, the device 104 itself, a transaction being performed by the device 104 and other device 106, and/or data sent between devices 104, 106 that can be transaction data or other kinds of data. The verification code can be subdivided and different parts used for different purposes.

The verification code can be separately determined in each device 104, 106, and by the fact of entanglement correlation with be the same, yet not requiring communication of the code outside the devices, thus creating a shared secret. The shared secret can be used as a cryptographic key or onetime pad for the transfer of information such as credit card numbers, personal user data, or other sensitive information between the authentication terminal and the hand held device. The shared secret can be subdivided such that a portion is used for an authentication code and another portion is used as a cryptographic key or one-time pad. The verification code can be subdivided and each subdivided part used as described herein to perform each of multiple functions related to verification, identification and/or secrecy.

Figure 2A:
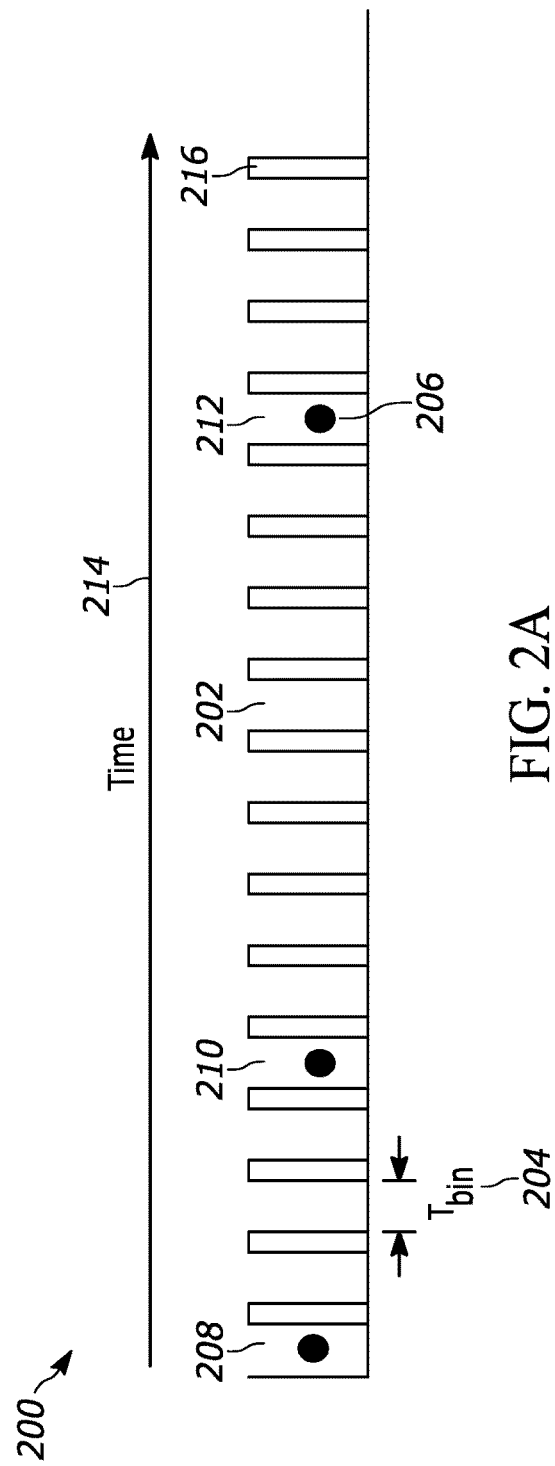
FIG. 2A illustrates an embodiment of a time-based state comb for an authentication and verification system and method using entanglement of the present teaching.

FIG. 2A illustrates an embodiment of a time-based state comb 200 for an authentication and verification system and method using entanglement of the present teaching. A time-based state comb 200 is defined by bins 202 having a bin length 204, thin, where events are inserted. The bins 202 progress along a continuous local time axis 214. A measurement of a single photon is placed in a time bin, forming an event 206 that corresponds to the time along the axis when it was sampled in a bin. In the comb 200 of FIG. 2A, there is an event in the first bin 208, the fifth bin 210 and the fourteenth bin 212, of the series of bins that run along the time axis 214.

In some embodiments, the bins 202 are separated by a bin separation time 216. This separation time 216 can be short or long compared to a bin length, $t_{bin}$, 204. The bin separation time 216 may be a period where no measurement can be made, for example a blanking time in a detector. Thus, the bin separation time 216 can result, for example, from limitations of the speed of the detector and/or measurement apparatus. The bin separation time 216 can also just be a period where no measurement is chosen to be made. The bin separation time 216 can be chosen to provide a desired time pattern of the comb 200. In some embodiments, the bin separation time 216 is substantially less than, e.g. <<1% of, the bin time 204.

An important feature of the present teaching is the realization that while some embodiments of a comb 200 of the present teaching demand stringent requirements on bin length 204 duration and/or bin separation time 216 duration, other embodiments are less dependent on the particular values of bin length 204 and bin separation time 216, as long as these parameters 204, 216 are well defined.

One feature of the present teaching is that cross correlation of combs generated through detection of pairs of entangled photons allows the sharing of the entangled quantum states in a way that is robust against noise and/or errors in the measurement. In an ideal case, correlating two combs of entangled pairs would yield a count of the number of pairs at the alignment condition and a count of zero at every other position. In practice, noise counts will errantly align, and so positions other than pair alignment will have non-zero counts. Combs may be configured to try to maximize the likelihood that when two combs are aligned, we have identified the correlated thus alignment of entangled photons. Comb processing benefits from the statistics of the pair creation versus the noise. Uncorrelated events that occur at the same time have probabilities that multiply. The entangled pair generation is guided by a probability of generation, which is in SPDC systems nominally proportional to pump energy. The noise photons occur in pairs with a probability of a single photon squared. This means the noise is naturally suppressed as compared to the signal of the correlated pairs during the process of adding the two combs at the alignment position.

Figure 2B:
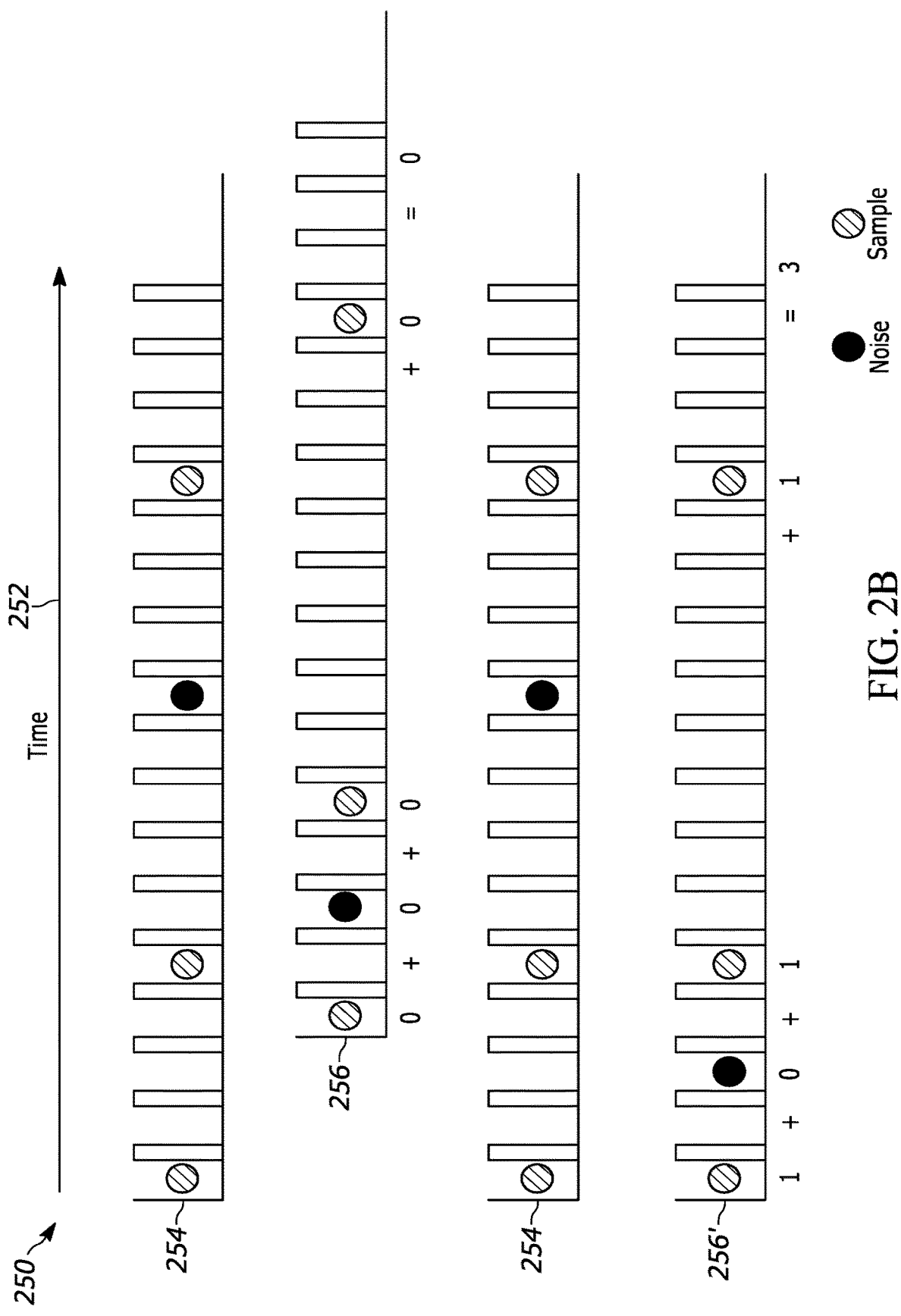
FIG. 2B illustrates an embodiment of a time-based state comb for an authentication and verification system and method using entanglement being correlated of the present teaching.

FIG. 2B illustrates an embodiment of a time-based state comb 250 for an authentication and verification system and method using entanglement being correlated of the present teaching. A time axis 252 represents local time at one measurement site that is receiving a stream of single photons having one of the pair of generated entangled pairs. In this case, the measurement site is the site associated with the comb 254. Similar to the comb described in connection with FIG. 2A, a measurement of a single photon is placed in a time bin, forming an event dot that corresponds to the time along the axis when the photon was sampled. In comb 254 representing measurements of a stream of one of the pair of entangled photons, there is an event in the first bin, the fifth bin, the tenth bin and the fourteenth bin. The events in the first, fifth and fourteenth bins are actual photon measurements and the tenth bin is a noise measurement.

In a comb 256 representing measurements of a stream of the photons of the other of the pair of entangled photons, there is an event in the first bin, the third bin and the fourteenth bin. The events in the first, fifth and fourteenth bins are actual entangled photon measurements and the third bin is a noise measurement. The time bins of two combs 254, 256 are slid by each other one-time bin at a time. That is, one comb is shifted by a fixed amount relative to the other, and a count of matches is taken at each offset. In some embodiments, the offset is one bin. At each discrete position, for example the point where time bins of equal size align, a count of the number of correlated measurements, for example, bins aligned that share the same event state, is made. This stepping through offset of combs and compare by adding up matches at each offset, can be performed using an algorithm. The algorithm looks for the position of the set of offset positions with a maximum number of correlated measurements. At a first point in the correlation, shown by combs 254, 256, there are no matched states, and the correlation value is zero.

If a noise event is measured on one comb and not the other, it is not counted. Because this represents a position where the measurement of pairs is not aligned, the only matches would be if two noise photons overlapped, or a noise event in one comb happened to match a detected pair photon. The time bins are matched for maximum cross-correlation when the count is maximized. This method of matching combs will be understood by those skilled in the art as the equivalent of a binary cross correlation function for vectors that consist of just 2 states, 1 and zero. For the example shown in FIG. 2B, that occurs where the three events line up. The maximum correlation occurs with the position shown in comb 254 and comb 256. The value is three matches. All other offset positions had fewer matches. There are no contributions from noise photons in this example. The number of calculations, or in this case, different relative comb positions that must be added, is equal to the number of time bins of a particular measurement comb. This is just an example, in some embodiments, combs can be thousands, hundreds of thousands, millions, or billions or more bins long and the process is the same.

As described herein, time bins 202 of a time-base state comb 200 may contain a variety of different kinds of state measurement values, including one or more values per photon (bin). For example, bins may contain markers that indicate simply that a photon was detected (sometimes referred to as an event), or they may include the actual measured value of one or more states of that detected photon (e.g., wavelength or polarization). If a measured value is available, a correlation is only counted if the measured value matches. This gives the correlation more specificity, and more noise immunity. This method will be understood by those skilled in the art as a variation on a cross correlation function, where rather than multiplying values and summing, we are only counting perfect matches. For example, if the states were 1, 2, 3, 4, 5 and two states matched with the value of 3, rather than multiplying 3×3 then as adding 9 to the total, this method would add 1 to the total.

It is possible to provide a closed-form assessment of the noise limits in some embodiments of the combs of the present teaching. For example, for a case of combs resulting from detections of pairs of entangled photons, we can define:

1) the P(Entangle Pair Generation)=P(EPG) as the probability in a single time window an entangled source will give birth to an entangled pair; 2) the P(Noise Detector 1)=P(ND1) as the probability in a single time window a noise photon will be detected at a first detector; and 3) the Prob(Noise Detector 2)=Prob(ND2) as the probability in a single time window a noise photon will be detected at a second detector.

The cross correlation is represented by a function:

$$C(k)=\Sigma_{k=-\infty}^{\infty} d1(m)d2(m-k).$$

For this function, k=offset (that is, the amount the comb is slid forward or backward in time), d1(m) is an array of event values at the first detector, and d2(m−k) is an array of offset (by k) event values at the second detector. The +/−∞ in this case is theoretical. In practical cases, you can stop calculating C(k) when you have exhausted the event set. Approaches for practical cross correlation and matching systems and methods are described in more detail later.

A match is found when a maximum is located for C(k) over all values of k. When the maximum is found, the combs are correlated when offset by k. The elements that match form a random set that is perfectly correlated with another random set.

Figure 3:
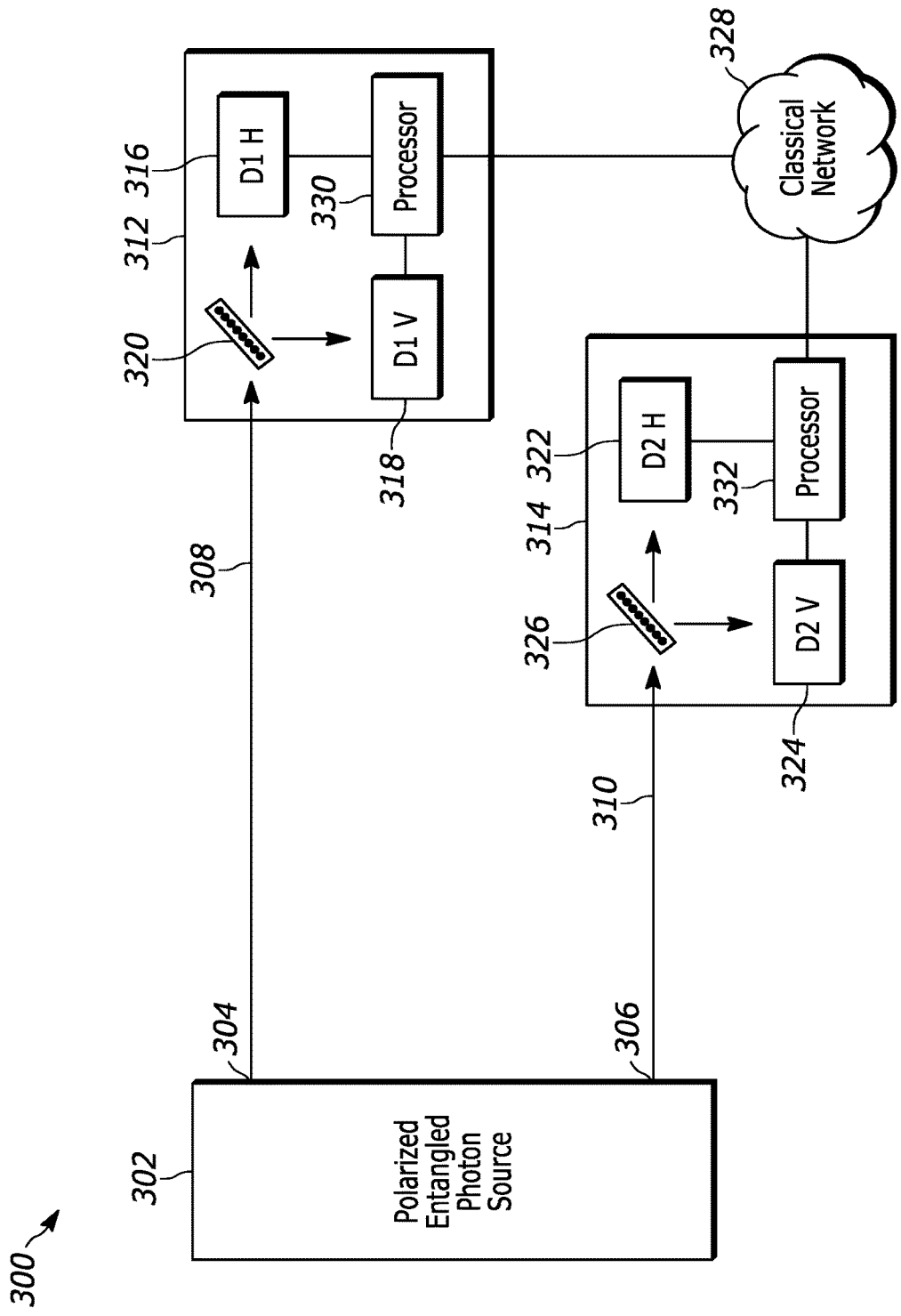
FIG. 3 illustrates an embodiment of a system for generating a shared measurement comb in time and polarization for an entangled photon authentication and verification system of the present teaching.

FIG. 3 illustrates an embodiment of a system 300 for generating a shared measurement comb in time and polarization for an entangled photon authentication and verification system of the present teaching. A polarization entangled source 302 produces entangled pairs that emerge from a pair of ports 304, 306. The first port 304 is illustrated as producing one of the pair of photons, and the second port 306 is illustrated as producing the other of the pair of photons. In some embodiments, the source 302 generates a photon at the first port 304 that is entangled in time and polarization with a photon that emerges at the second port 302. Thus, when a photon that emerges from the first port 304 is measured to determine its polarization and time of arrival, those two values will be correlated with the values of a measurement of polarization and time of arrival of the paired, entangled, photon that emerges from the second port 306.

We denote here the two polarization states as H and V as understood by those skilled in the art as being orthogonal dimensions of polarization. While H is associated with a horizontal dimension and V is associated with a vertical dimension, these are arbitrary designations. Values of polarization are random variables that emerge from the source ports 304, 306. The measured values of the random variables are perfectly correlated from pairs. In the case of polarization for many embodiments, measurement of a value H for one photon in a pair produces a value V for the other measured pair. However, the polarity of the correlation is arbitrary, and depends upon particulars of a measurement configuration. The key is that measured values can be correlated to find a match. Two different polarizations, then can represent a 1 and a 0, and therefore the set of measured pair values can be represented as a binary number. If only the polarization (or any two-state-dimension basis) is being used to find a match, it is clear that more than one or even two of the measured values are needed to establish the match.

It should be understood that a time of arrival of any given photon at a detector is determined by a path length from the source 302 to a detector and that this value of path length may change over time, both intentionally and non-intentionally. It should also be understood that it is a time between arrivals of photons from two different sets of entangled pairs that is the entangled resource. That is, a time between two successive single photon counts at detectors that are measuring two sets of pairs of time-entangled photons will measure the same time between events that represent detection of a single photon. The actual time may be the same as measured against a common clock, but is more likely to be quite different. It is possible to account for this time of flight difference using an external system that monitors and tracks any offset and reports it to the receivers so that it can be accounted for. Alternatively, the receivers themselves can derive time of flight information and do local reconciliation.

In some specific embodiments that do not limit the scope of the invention, the entangled photon source 302 is a crystal pumped by a laser that generates time and polarization entangled photons via spontaneous parametric down conversion. One of the entangled pairs emerges from port 304, and the other emerges from port 306. The time of photon generation is random; however, it is understood that the pairs of photons are always generated at precisely the same time. Also, the polarization of the photons is random. However, the pairs of photons when measured, will always be correlated but will have the same or the opposite polarization depending on the specific crystal used and also the configuration of the detector. The photons are routed over optical paths 308, 310 to two receivers 312, 314. The optical paths 308, 310 can be free space paths or any kind of guided paths, such as a fiber optic links or integrated optical waveguides. It should be understood that the numerous applications of the methods and apparatus of the present teaching will require optical paths that are very short for use in, for example, integrated components and/or mini-free-space optical bench systems, relatively short for use in, for example, a data or computing center, as well as relatively long for use in, for example, applications requiring a long-distance terrestrial, undersea link and/or satellite link. In other words, depending on the application, the optical paths 308, 310 can be on order of microns to on order of many thousands of kilometers.

The first receiver 312 includes a first single photon detector 316 and a second single photon detector 318. The detectors 316, 318 have inputs that are positioned in the optical paths of the outputs of a polarization beam splitter 320. The polarization beam splitter 320 is oriented to pass H-polarized photons to the input of the first detector 316 and to pass V-polarized photons to the input of the second detector 318. A polarization beam splitter 320 is shown for embodiments where the second basis, other than time, is polarization. More generally, an optical analyzer can be used that directs photons having one state to the detector 316 and photons with the second state to the second detector 318. Thus, the receiver is able to distinguish quantum states of the basis other than time based on which detector detects the particular photon. The time basis is measured by the arrival time of the particular photon at the particular detector 316, 318.

The second receiver 314 includes a first single photon detector 322 and a second single photon detector 324. The detectors 322, 324 have inputs that are positioned in the optical paths of the outputs of a polarization beam splitter 326. The polarization beam splitter 326 is oriented to pass H-polarized photons to the first detector 322 and to pass V-polarized photons to the second detector 324. As with receiver 312, this receiver can also be configured to measure other two, and higher, dimensioned entangled photon but using an analyzer that directs the photon to a detector 322, 324 based on the value of the state.

The two receivers 312, 314 are also connected via a classical network 328. In various embodiments, the classical network 328 can be any of a variety of known networks. For example, the networks can be fiber optic networks, wireless networks, satellite networks, free space optical networks and/or combinations of these networks. The network can include one or more Bluetooth communication channels. A key feature is that it is not necessary that the networks have any particular performance characteristics, such as latency guarantees, timing and/or synchronization requirements, packet loss performance and other known network performance metrics. Either of the two receivers 312, 314 could be part of, for example, the device 104 or the other device 106 of FIG. 1, and the other of the two receivers 312, 314, could be part of the other of the two device 104 or other device 106.

In many embodiments of the system of the present teaching, the receivers 312, 314 have information on timing of every, or early every photon arrival. This information can be derived through a combination of arrivals detected in the detectors 316, 318 or detectors 322, 324 in a given receiver 312, 314, as well as can the polarization of each arrival. For example, the detectors can be configured to generate an electrical signal in response to receiving a single photon in a first state of polarization at a particular time. This allows the measurement of both the time of arrival and the polarization state. Some or all of this information may be included in the comb generated by the processor 330, 332 and shared. That is, the processors 330, 332 can process the electrical signals from each detector, that include information regarding arrival time of a photon and a polarization state for each measured photon, in a way that uses some or all of the measured state information as needed by a particular comb for a particular application. Combs may include, for example, a list of times of arrival (timing comb) and no polarization state information, and/or a comb may be generated to include polarization values and time of arrival. A sequential list of polarizations may also be generated using the single photon events captured by the detectors 316, 318, 322, 324.

The system 300 of FIG. 3 can be used for applications that share a random number that can be used for authentication and verification. This shared random number is also secret, in that only the two receivers 312, 314 have the shared value. In this application, one of the pair of photons arrive at the D1 receiver 312. After passing through or being reflected by the polarization beam splitter 320, they are detected by either detector D1H 316 or detector D1V 318 based on their polarization. The time of detection and the polarization are recorded in a timing comb generated in processor 330 as described herein. One of the pair photons arrive at the D2 receiver 314. D2's polarization beam splitter 326 is oriented for the same basis as D1's beam splitter 320. When the one of the pair of photons strike the polarization beam splitter, they are routed to either detector D2H 322 or detector D2V 324 based on their polarization. The time of detection of and the polarization are recorded in a second timing comb generated in processor 332 as described herein.

Processor 330 in D1 receiver 312 shares its timing comb over a classical channel provided by the classical network 328 with just a mark indicating windows where a detection occurred and not the polarization measured for the photon that is sampled at the mark. Processor 332 in D2 receiver 314 then slides its generated comb in time through the comb generated by processor 330 and counts the number of correlated detector hits. By sliding, we mean comparing the two lists at each of a series of different time shifts between the two lists. By comparing, we mean adding the number of matches per relative time position of the shift. So together by sliding and comparing, we are referring to the ability to generate a cross-correlation of the two lists. When the number of correlated detector hits is maximized, processor 332 in receiver D2 314 uses its measured polarizations in those bins as the correlated data which becomes the shared secret.

Although it is not shown in FIG. 3, either or both of the receivers 312, 314 can include quantum storage in front of the analyzer, polarization device 326, that holds the entangled photons for a set period of time and can be used to manage the timing of the measurement of the entangled state.

This process of sliding combs to generate a maximum may be referred to herein as a quantum cross-correlation. By sliding the combs in the processor 332 to achieve maximum correlation, the time-of-flight from the entangled source to each of the receivers is zeroed out and immaterial to the outcome. It is understood by those skilled in the art that either receiver 312, 314 can perform the process of sliding combs to determine a maximum. As understood by those skilled in the art, if a fixed path length offset is established between the two nodes, then the time position, or relative offset, determined by the finding of the maximum in the auto-correlation tracks any changes in the relative path length. Thus, the combs of the present teaching can be used to determine relative positions, or relative changes in path length from source 302 to receiver 312, 314 in the system 300. The processors 330, 332 use the polarization values of the matching values found in the correlation as a shared random number.

Referring back to FIG. 1, a portion of the shared random number generated by the handheld device 104 is used as one side of a verification code. A corresponding portion of the shared random number generated by the authentication terminal 106 is used as the other side of a verification code. A portion of the shared random number is the verification code used by the verification application. When the verification codes are compared and match, a verification process is complete, and the handheld device, or an application or data in the handheld device associated with the verification code, is then verified by the verification terminal. The matching process finds the values that are the random number, and in some embodiments a predetermined assignment of which portion of the matched values determines the start and stop of the portion of the random number that are verification codes.

The particular configuration of the receivers 312, 314 that include a polarizing directing element 320, 326 is just one specific example. The receivers may be constructed more generally so long as each detector generates an electrical signal at an output in response to receiving a single photon in a particular state of an entangled system's possible states.

A method for determining quantum entangled state information according to the present teaching includes generating a plurality of first photons and generating a plurality of second photons, wherein the first and the second photons have entangled quantum states. The plurality of first and the plurality of second photons are entangled in at least one basis that can include polarization, wavelength, space, and/or time. A first ordered list of events is generated in response to measuring at least one of a first and second quantum state of at least some of the plurality of first photons. A second ordered list of events is generated in response to measuring at least one of the first and second quantum state of at least some of the plurality of second photons. In various methods, the first and second ordered list of events can include an ordered list of arrival times of single photons, differences between arrival times of single photons, an ordered list of polarization measurements, an ordered list of wavelengths, or an ordered list of spatial position measurements.

The measuring at least one of the first and second quantum state of at least some of the plurality of first photons can be performed at a physically different location than the measuring of at least one of the first and second quantum state of at least some of the plurality of second photons. The first and second ordered list of events are then compared to identify entangled quantum state information from the entangled quantum states.

A method for authentication and verification using entangled photons according to the present teaching includes measuring a first plurality of quantum states and generating a first list comprising values related to the measured first plurality of quantum states. A second plurality of quantum states, where at least some of the second plurality of quantum states are correlated with at least some of the first plurality of quantum states is measured. A second list based on the measured second plurality of quantum states is then generated. The first and second lists can be lists of, for example, arrival times, differences between arrival times, time bins, polarizations, wavelengths, spatial positions and any combination thereof. The generated first list and generated second list are compared to find related elements. The comparing can include a correlation or one of numerous types of pattern matching. The comparing can also include sending at least part of one of the first and second list over a network. This method can include generating timestamps and adding the timestamps to at least one of the first and second list. A shared secret is then generated in response to at least two values of the related elements.

A method of determining quantum entanglement according to the present teaching includes generating an electrical signal in response to detecting a plurality of single photons. The generated electrical signal is then processed to generate a list representing a plurality of arrival times and polarizations of detected single photons. Some of these methods also include converting the list representing a plurality of arrival times and polarizations of detected single photons into a list comprising time bins. The processing the electrical signal to generate the list representing the plurality of arrival times and polarization of detected single photons comprises determining a time between detector hits for at least one polarization state and recording the time as a number. The generated list is then compared with a second list to determine at least one shared entangled quantum state. The comparison can, for example, be a correlation, and/or finding matches or some kind of relationship between the generated list and the second list at different relative positions of elements in the generated list and the second list. Once the matches are found, the polarization values associated with each matched item in the generated list and second list are used as a random number. The random numbers in each node derived in this way are correlated, and known only by the local nodes. As such, these random numbers in each node can form a shared secret random number.

Referring back to FIG. 1, a portion of the shared secret random number generated by the handheld device 104 is used as one side of a verification code. A corresponding portion of the shared secret random number generated by the authentication terminal 106 is used as the other side of a verification code. A portion of the shared secret random number is the verification code used by the verification application. When the verification codes are compared and match, a verification process is complete, and the handheld device, or an application or data in the handheld device associated with the verification code, is then verified by the verification terminal. The matching process finds the values that are the shared secret random number, and in some embodiments a predetermined assignment of which portion of the matched values determines the start and stop of the portion of the random number that are verification codes.

Figure 4:
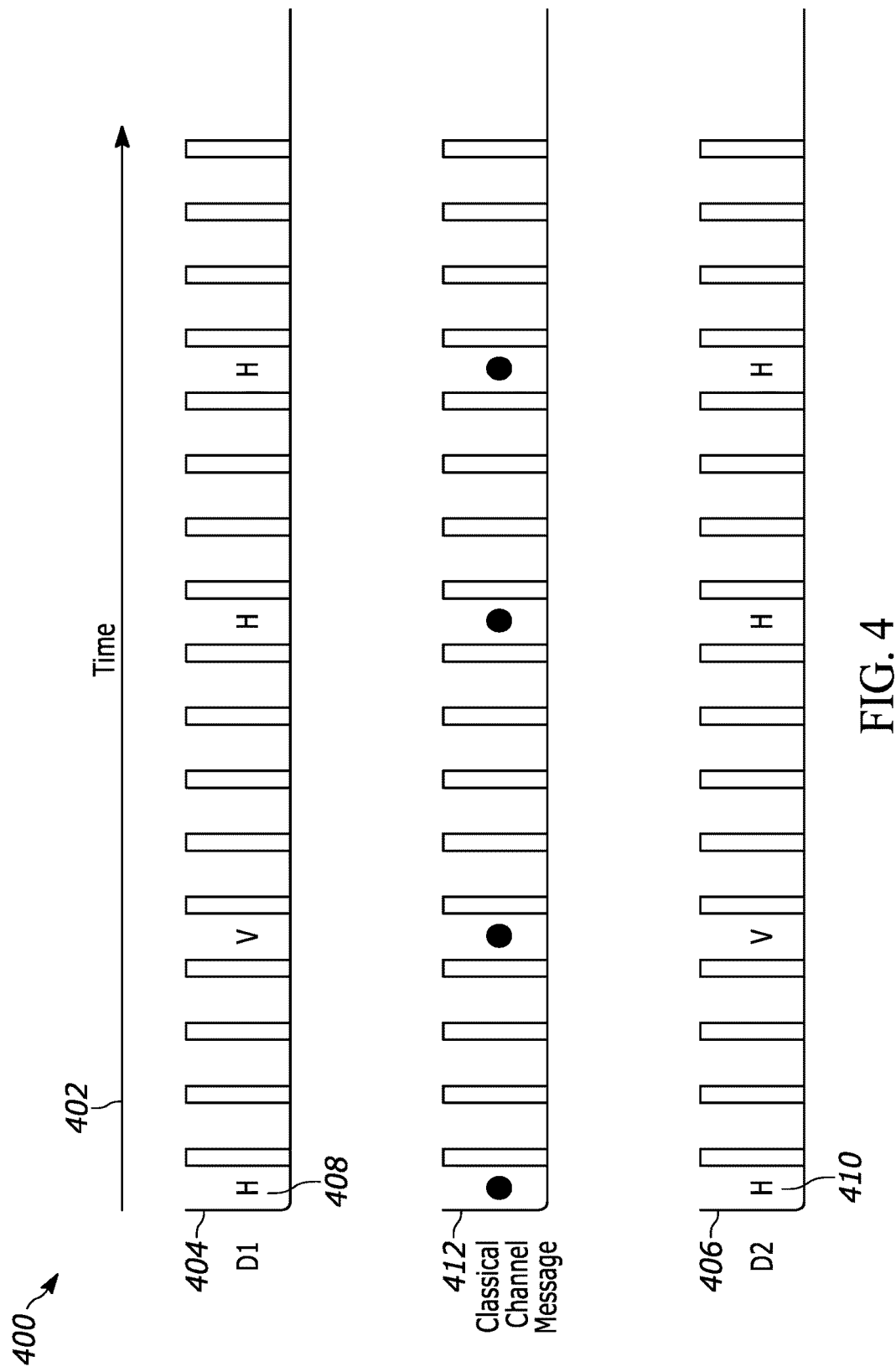
FIG. 4 illustrates generated combs for an embodiment of an authentication and verification application using entangled photons of the present teaching.

FIG. 4 illustrates generated combs 400 for an embodiment of an authentication and verification application using entangled photons of the present teaching. The combs 400 are generated with respect to a time axis 402, and the alignment shown of the different combs 404, 406, 412 in the figure is illustrates a relative position for each comb when the autocorrelation has been maximized. This alignment is more of a conceptual construct as it is determined after the data has been collected and does not reflect any sort of real-time operation. The time base 402 is illustrated to represent a common time base for receivers in two different locations to establish a common sequence of events with, for example, offset times that can be quantified relative this common time base 402. Alignment with respect to this time base 402 is performed after the fact of measurement and time base 402 can be arbitrary. In some embodiments, time-base is a local clock in one or the other nodes.

Referring to both FIGS. 3 and 4, the comb 404 can be generated by the first receiver 312 and the comb 406 can be generated by the second receiver 314 and are illustrated with particular measured values of polarization 408, 410 (H or V) in each time bin. As can be seen, photons were measured in bins 1, 5, 10 and 14. Empty time bins have no measured photons. A comb 412 is generated to be sent by the classical channel by receiver D1 312. This comb only exposes the time bins (1, 5, 10 and 14) that measured photons, not the values of polarization. The sharing of this comb 412 with receiver 314 and correlation processing in D2 receiver 314 with comb 410 reveals the values of the polarization that represent the shared, secret, random number. This is just one example of how pattern matching can be used to determine the correlated quantum states, which can then be used to share a secret that comprises a set of random values.

When available, combs can also contain information from a local clock. In this example, a time comb includes a time stamp from a local clock at the detector. The indication of what time it is marking is arbitrarily chosen by the user, but in this case, let's say it's pointing at the first bin. The time stamp is the setting on the local clock at the detector when first bin detected that photon. The time stamp is appended to the comb 412. As described in more detail below, time stamps can be used as follows: 1) to measure the relative distance of two receivers from the source because the difference in time stamp values is the difference in flight time; 2) if the distance is known, a time stamp can be used to synchronize the clocks at two different receivers; 3) if the link is initially known to be clear of eavesdroppers, a change in the difference between time stamps between two receivers can be used to identify the eves dropper's presence, as the eves dropper adds latency.

Figure 5:
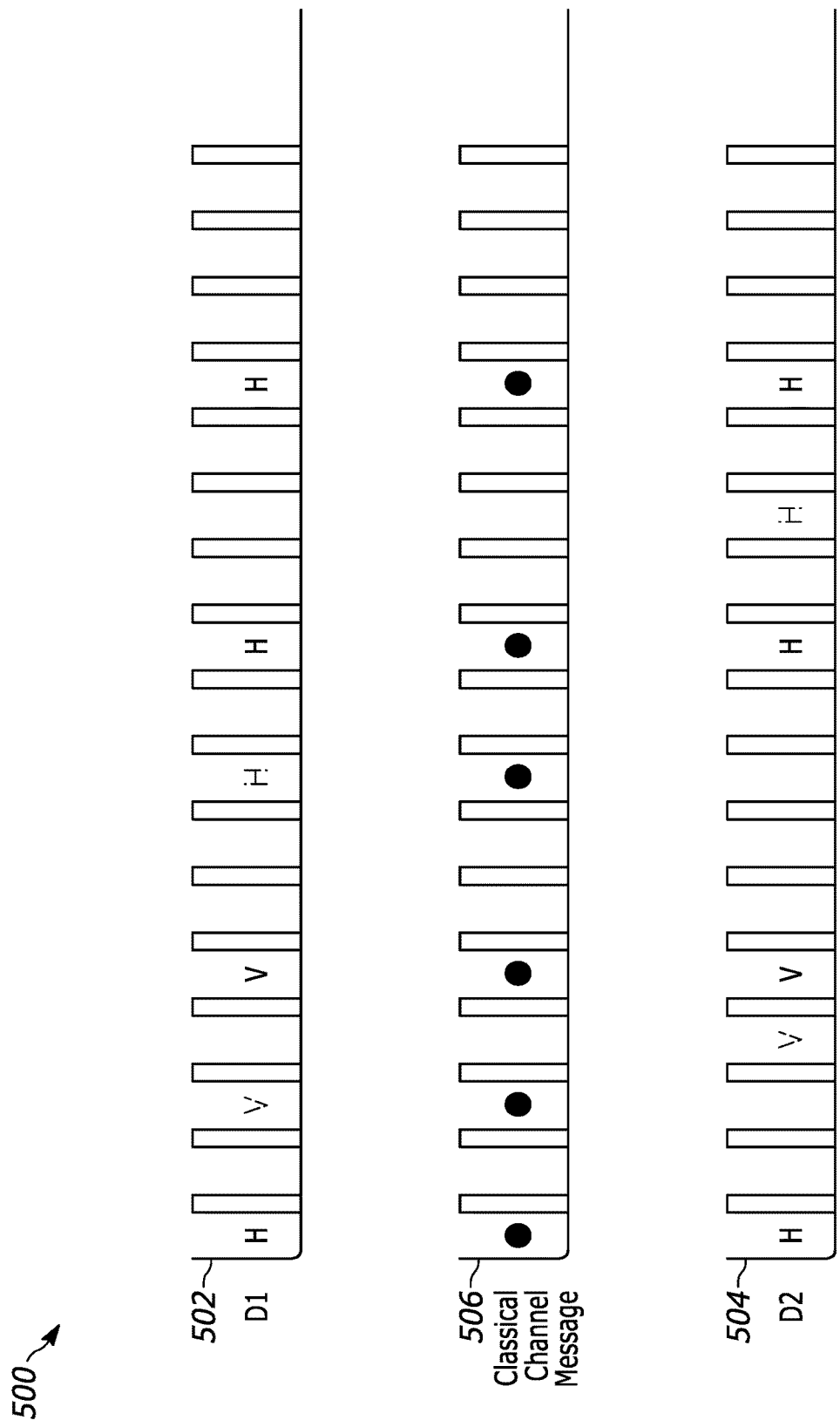
FIG. 5 illustrates embodiments of generated state combs with noise in an embodiment of an authentication and verification application using entangled photons of the present teaching.

Noise can cause detector counts in time bins that are from unwanted sources such as ambient photons and thermal detector noise. Measurement combs according to the present teaching can help to filter out these noise events. FIG. 5 illustrates embodiments of generated combs 500 with noise in an embodiment of an authentication and verification application of the present teaching. Referring to both FIGS. 3 and 5, a comb 502 generated by the first receiver 312 and a comb 504 generated by the second receiver 314 are illustrated with particular measured values of polarization (H or V) in each time bin. As can be seen, photons were measured in bins 1, 3, 5, 8, 10 and 14 in comb 502. Photon were measured in bins 1, 4, 5, 10, 12 and 14 in comb 504. Empty time bins have no measured photons. Noise photons are illustrated in grey and are in bins 3, and 8 in comb 502. Noise photons are in bins 4 and 12 in comb 504. A comb 506 is generated to be sent by the classical channel by receiver D1 312. This comb only exposes the time bins (1, 3, 5, 8, 10 and 14) that indicate measured photons, not the values of polarization. The sharing of this comb 506 with receiver 314 and correlation processing in D2 receiver 314 with comb 504 reveals the values of the polarization that represent the shared, secret, random number. The only noise events that will result in undetected errors, are noise events that occur in the same time bin for both D1 and D2. If the probability of a noise event in a given time bin is x, and noise events in the idler and signal paths are independent, then the probability of a simultaneous noise event is x**2. For example, if noise events occur in 1/1000 of time bins, then the undetected error probability is 1/1,000,000.

The combs illustrated in FIGS. 2A-B, 4 and 5 can be referred to as time bin combs that include regularly spaced bins that contain events when a measurement of that event coincides with the particular bin time, or happens during a time that falls in a particular bin. It is also possible to mark events with timestamps. The scheme for marking events does not change the basic idea of the combs and comb matching, but it can have effects on how the matching process is done and/or the resolution of the time aspects of the state values. One feature of the authentication and verification using entangled photons of the present teaching is that the shared random numbers can be generated by either using time bin combs or timestamps.

Figure 6A:
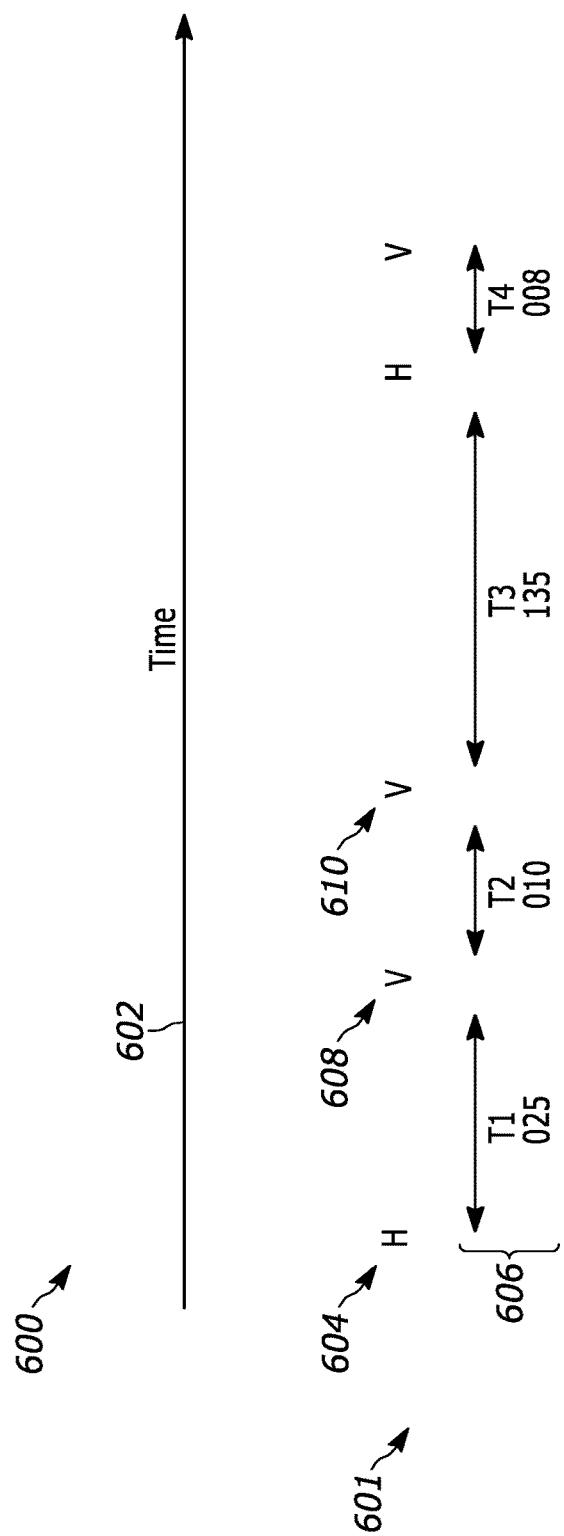
FIG. 6A illustrates state combs with timestamps for an embodiment of a system and method of authentication and verification using entanglement of the present teaching.

FIG. 6A illustrates state combs 600 with timestamps for an embodiment of a system and method of authentication and verification using entanglement of the present teaching. This embodiment relies on event combs that comprises events and a measured time between each event. For example, an event could be a single photon arrival and the time between arrivals can be provided in the comb. As another example, an event can include determination of a polarization state of an arrived photon and the comb presents both a polarization state and a measured time between arrivals.

Referring back also to FIG. 3, receiver 312 detects the single photons from a port 304 of the source 302 and generates electrical signals representing the time of arrival and polarization of detected photons. The processor 330 converts these electrical signals into a comb 601 that is illustrated with respect to local measurement time base 602. This comb presents measured polarization states, H or V, 604, 608, and time between arrivals 606. In this example, the first polarization state is H 604, a time elapses of 0.025 seconds 606, and then a second polarization state of V 608 is measured, followed by a time duration of 0.01 seconds to a third detection, in this case a V, and so on. The processor determines state and the time between detector hits that is recorded a number. This is in contrast, for example, to the combs 400 described in connection with FIG. 4, where detections are connected to a bin number. Comb 601 can be thought of as a continuous-time comb, or a time-stamp comb, as compared, for example to time bin combs 400 illustrated in FIG. 4. The comb 601 can be simply represented as a message, for example, H025V010V135H008 that is sent over the classical network 328 to the second receiver 314. Or the comb does not include the polarization values, so that those values remain local, in which case the message could be, for example, 025,010,135,008.

A feature of the present teaching is that by comparing local current time stamp with the header, it has been determined that offsets in timing between the two receivers 312, 314 can be precisely tracked. Such information could be used for numerous applications and systems can be configured to achieve difficult or even otherwise impossible tasks. For example, if differences in optical path delays between receivers 312, 214 and source 302 are known or separately tracked, sharing the comb 601 with timestamps can maintain extremely precise or even near or essentially perfect synchronization of the local clocks in the receivers 312, 314. Since for example, SPDC systems generate entangled photons at exactly the same instance in time, wherein the synchronization accuracy of such a system is only limited by the precision of the detectors. In some systems, the precision will essentially depend only the accurate of the relative positions, which can be determined with a high level of precision with interferometric techniques. In some particular methods according to the present teaching, regardless of the known offset in transit time, the second receiver 314 adjusts the local clock by finding the difference between the timestamps, taking account of time-of-flight offset, and adjusting the local clock based on the remaining difference that represents a synchronization error.

As another example, if precise free running clocks are available in the receivers 312, 314, sharing the comb 601 with timestamps can be used to determine optical path differences between the nodes 312, 314 and/or source 302. The differences can be intentional differences that might be part of a signaling scheme. The difference can be unintentional differences, that might be used to correct or control other timing-based processing that is ongoing within and amongst the receivers 312, 314. The local clock adjustment and/or optical path difference determinations can be included as part of the authentication and verification system. In some embodiments, some of the measured state values are applied to the adjusting and/or path difference determinations and others of the measured state values are applied to the verification code.

Figure 6B:
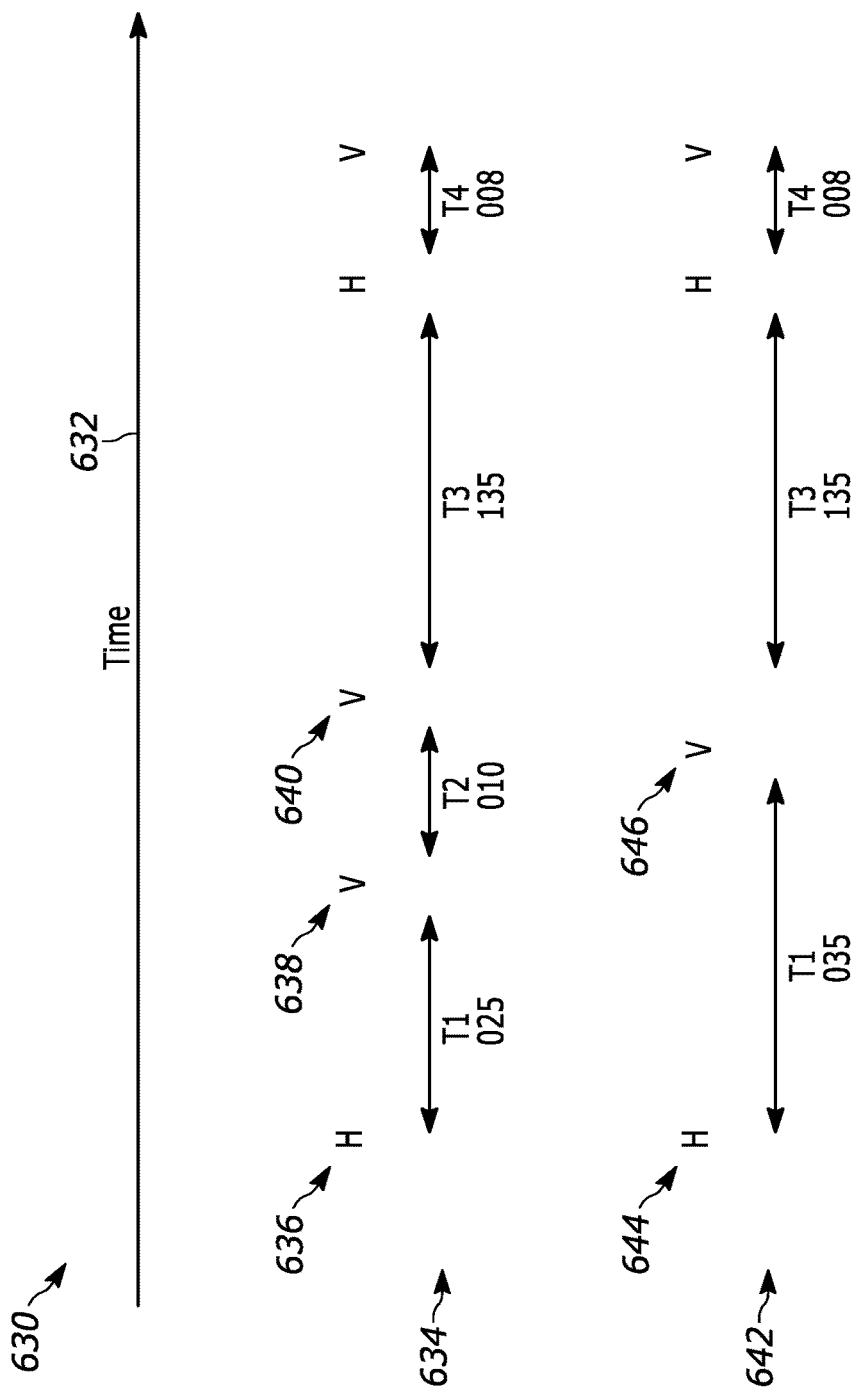
FIG. 6B illustrates the embodiment of state combs for the system and method of authentication and verification using entanglement with noise of the present teaching.

FIG. 6B illustrates the embodiment of state combs 630 for the system and method of authentication and verification using entanglement with noise of the present teaching. The event measurements along time axis 632 include a pair photon H 636, then a noise, or errant, measurement V 634 0.025 seconds later, then a pair photon V 640 0.10 seconds later, and so on. The other pair measurement system receives in comb 642 a pair H 644, then a pair photon V 646 0.035 seconds later, and so on. The first pair comb may be represented H025V010V135H008V. The second pair comb may be represented H035V135H008V.

Figure 6C:
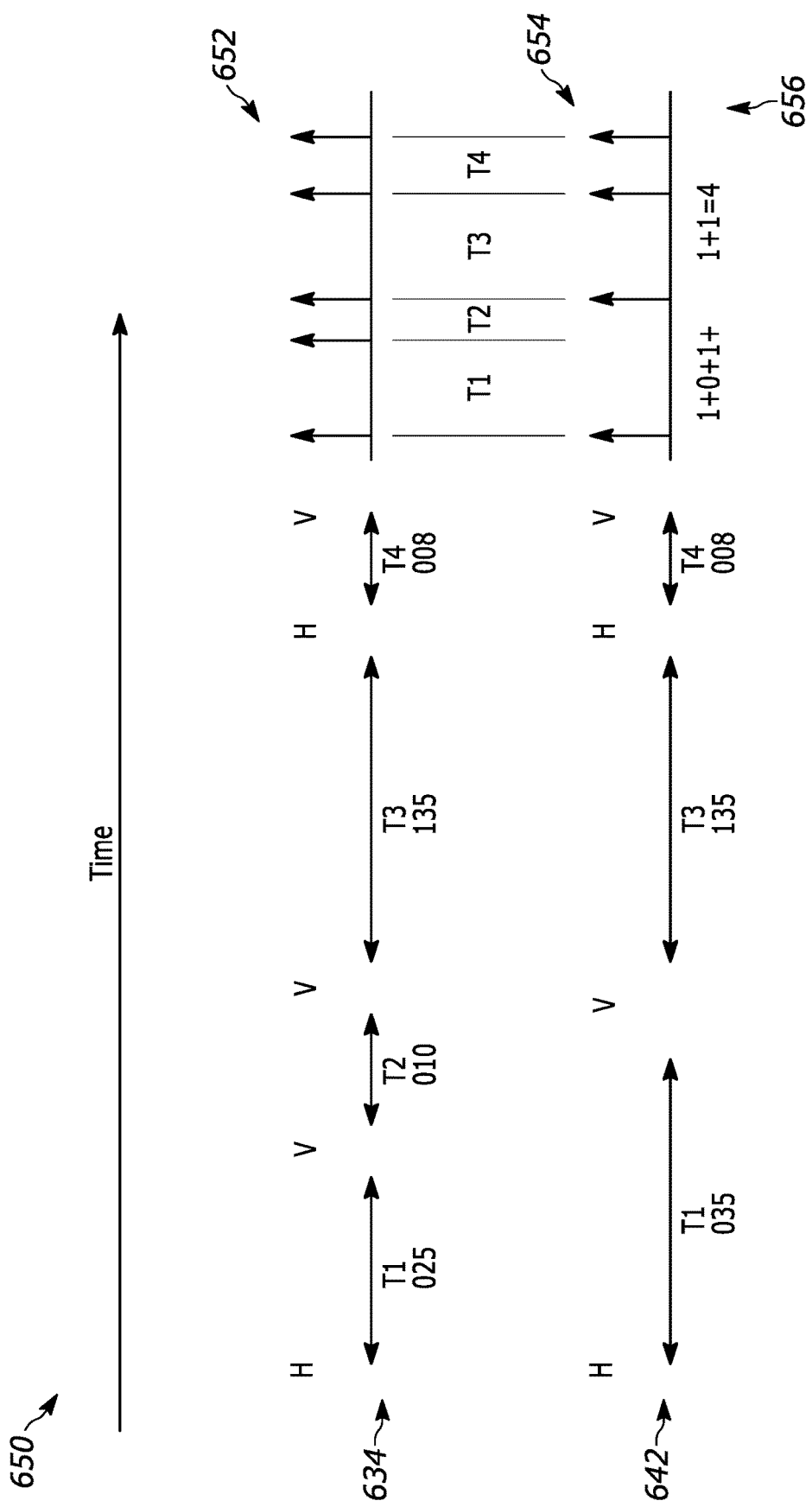
FIG. 6C illustrates an embodiment of correlating state combs of FIG. 6B.

It is possible to correlate these combs to find matching state values that result from measurements of entangled photons in various ways. For example, FIG. 6C illustrates an embodiment of correlating state combs of FIG. 6B. The combs 634, 642 may be converted into tiny time bins where the size of the bin is related to the accuracy of the clock measuring inter-tick arrivals. Thus comb 634 is represented as time diagram 652. Comb 642 is represented as time diagram 654. Then, the correlation is equivalent to the time bin method, with likely small (narrower window) time bins. The matched position in the example time diagrams 652, 6 FIG. 6C illustrates an embodiment of correlating state combs of FIG. 6B 54 yields a correlated value of four. In this case, only a few alignments with the single noise photon have a summed value of one.

Other matching methods can also be applied. The birth times of entangled photons are absolutely simultaneous, thus T1, T2, . . . Ti are very precisely defined. If an exact time interval match is found when comparing combs, and the local clock is very precise (ticks are short in duration), then it is likely that a single match of inter-photon arrival times defines the entire ensemble. If the first position doesn't work, a second random position or a third will likely yield a match. As the accuracy of your clock improves, the probability of a match of the ensemble, given a match of a single interval, improves as well. In general, it is possible to step through time values added to all events in one comb and compare the two combs at each of these values, most of which will not yield many matches until a value is found that has a large number of matching time stamps.

Numerous data processing algorithms can be used to process measured data to compensate for noise. Noise can be defined for some applications as the probability of an erroneous non-entangled photon detection. When determining a match based on a single interval, it is important to define the measurement interval for the appropriate level of noise. For example, if a noise photon (such as the errant V measurement described in connection with FIG. 6B) is measured between the reception of two entangled photons, it should be ignored when processing the data. When time matching, the algorithm employed can, for example, add together adjacent intervals when single interval matches are not seen (for example, the T1+T2 described in connection with FIG. 6C).

One feature of the present teaching is that the combs can be processed using a variety of methods to find matches between combs. As described herein, for example, a cross-correlation of time-binned data produces a peak at a match position, and the elements of either comb that occupy that match position are nominally all correlated states. The regular time bins provide a basis for the time comparison between the data in the two combs. For example, time bins provide the basis for k in the equation C(k) described earlier.

One feature of the present teaching is that certain information about timing at different nodes and/or different detectors that are sharing combs can be used to improve the efficiency of the matching process and/or algorithm. For example, having knowledge of an absolute time at D1 and D2 (that is, detector(s), D1 that receive one of a pair of entangled photons and D2 that receive the other one of the pair) can reduce the range over which two vectors need to look for a match. Various known methods and systems can be used to provide this absolute time information. For example, GPS can provide accurate absolute time at multiple locations with an accuracy on the order of forty nanoseconds. Various classical network clock synchronization schemes, for example, Building Integrated Timing Supply (BITS), where timing information is sent along a standard telecommunication connection, can also be used to obtain absolute time. Using an internet connection, for example, Network Time Protocol (NTP) is generally accurate to about 0.01 seconds. Other customized options can also be used. For example, a one nanosecond accuracy scheme known as White Rabbit is used in some time-sensitive physics infrastructure. A physical "wire" or other connection with known or trackable latency between D1 and D2 can be used. A common clock can be used at D1 and D2.

For separated nodes, having some knowledge about the relative time of flight to D1 and D2 from the pair-generation point can be useful. If the locations are fixed, location offset can be normalized out to zero. If the locations are moving, a location offset can be set to maximum movement allowed in the system. For example, a ranging system (RADAR) that detects within 20 miles, would have a maximum ten millisecond offset. It is possible to use delta encoding for this time of flight. For example, if an object is moving, it doesn't displace from location X1 to location X2 instantly, it has a velocity, so time between measurements can be accordingly constrained by velocity of the object.

In some embodiments, timestamps can be converted into time-binned vectors and then cross-correlated to find the match offset. In some embodiments, the binned timestamps result in a very large and/or very sparse vector if the stamp time resolution is very high. As such, in some embodiments, steps are taken to reduce the number of bits in the time stamp. For example, a 64-bit time stamp, at 125-ps resolution, has 8 billion ticks per second. Sixty-four bits can count to 18^19 units, equivalent to seventy-four years. Thirty-two bits can count to 4 billion ticks, so looking at a second of timestamp data requires about thirty-three bits, while looking at 10 seconds of data requires about thirty-seven bits. As such, the timestamp needs less precision based on the knowledge about clocks and time-of-flight between detectors sharing combs.

In some embodiments, the precision of the timestamp is chosen to reduce a processing time (e.g. comb vector length) while maintaining a sufficient time resolution to find entangled correlations within a given background singles level. For example, for an entanglement generation rate of about ten pairs per second, a timestamp resolution of 125 picoseconds allows detection of entangled pairs with a low (<1%) error rate in a background of between 50K-100K counts per second. A timestamp resolution of one nanosecond allows detection of entangled pairs with a low (<1%) error rate in a background of between 5K-20K counts per second. A timestamp resolution of sixteen nanoseconds allows detection of entangled pairs with a low (<1%) error rate in a background of between 1K-4K counts per second. So, moving from 125 picosecond resolution timestamps to 1 ns resolution timestamps can take one to two off the above precision requirements. These optimizations can serve to reduce implementation costs depending on specific system requirements.

One feature of the present teaching is that algorithmic methods can be used for finding matches. Rather than translating time stamps into large sparse vectors of 0 and 1's (time-binning), it is possible to work directly with the time stamps. Various known methods can be used. For example, the simple brute force comparison search method can be used to look for matches. Additionally, a divide and conquer method that uses a progressive search, starting in the middle of the data series being compared and working by dividing by two each time can be used. This approach can reduce searches to on the order of n steps rather than an order of 2^n steps.

One feature of the specialized hardware can be used to improve the speed and efficiency of methods and systems of finding matches. For example, some embodiments, rather than a traditional Turing-machine search, utilize Content Addressable Memory (CAM) can be used. Some embodiments utilize specialized hardware that increments all stamps in a comb by one tick all at once and compares a large number of stamps to count matches in one cycle can be used. Some embodiments utilize state machines that are built using application specific circuits (ASICs). Some embodiments rely on known graphics and AI chips that include multiple processors to do functions that are equivalent to the batch increment and matching. For example, NVIDIA chips can be used that take advantage of the natural parallelism of the add and compare aspects of the computation.

Figure 7:
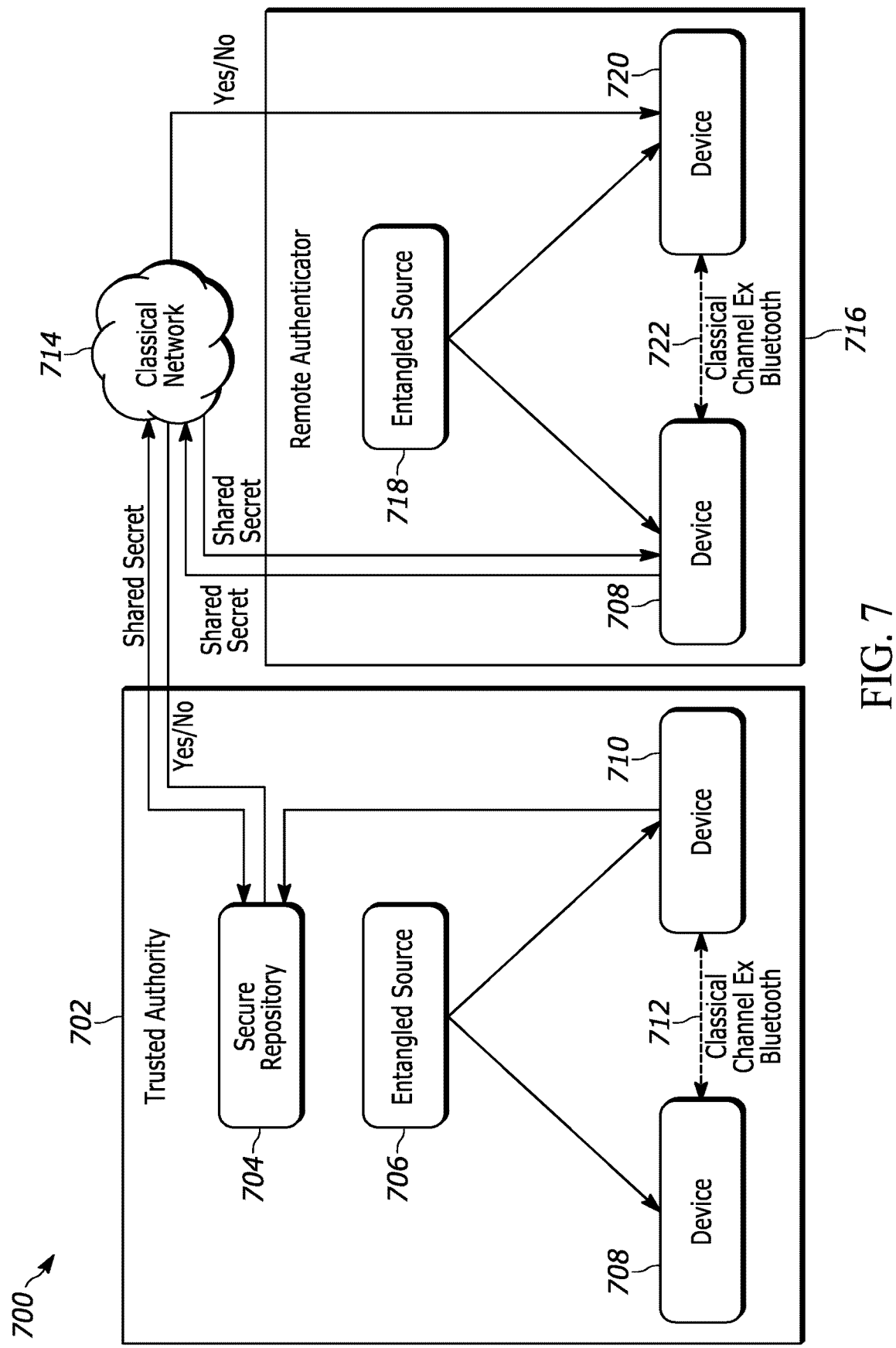
FIG. 7 illustrates an embodiment of an authentication and verification system and method using entangled photons with a trusted authority of the present teaching.

One feature of the authentication and verification method and system of present teaching is that it can be extended to include a trusted authority. FIG. 7 illustrates an embodiment of an authentication and verification system and method using entangled photons with a trusted authority of the present teaching. A trusted authority 702 includes a secure repository 704. An entangled source 706 produces pairs of photons, with one of the pair transported to a device 708 and the other of the pair transported to another device 710. These devices 708, 710 are similar to the devices 104, 106 described in connection with FIG. 1. The device 708 can be a handheld device or other personal device. And the other device 710 can be an authentication terminal or other point of sale device. The devices 708, 710 are connected by a classical channel 712 that could be a Bluetooth channel. The secure repository 704 is connected to a classical network 714 that connects remote locations. The secure repository 704 can be physically a part of the device 710. A remote authenticator 716 includes an entangled source 718. The entangled source 718 produces pairs of photons, with one of the pair transported to a device 708 and the other of the pair transported to another device 720. The device 708 and the other device 720 are connected by a classical channel 722 that could be a Bluetooth channel. The other device 720 in the remote authenticator 716 is connected to the classical network 714. The device 708 is connected to the classical network 714.

The authentication with trusted authority system 700 can work in multiple different ways, two of which will be described further. First, the party being authenticated can be assured that the authentication authority is the legitimate from a cold start as follows. A user with a device 708 goes to the trusted authority 702. The trusted authority 702 could reside in a bank or an ATM or other location. The trusted authority 702 identifies the user by some means. For example, they know the user, user biometrics, license, passport, bank account numbers, mother's maiden name or other means. The trusted authority 702 shares a random number via quantum means as discussed herein by connecting to the source 706. The random number is shared by the device 708 and the other device 710 and a portion of this random number is a verification code that is shared. The device 710 puts the code in a secure repository 704 with the identification information of the user. Only the user's device 708 and the authority's repository 704 know the verification code. In some embodiments, even the personnel at the trusted authority don't need to know the verification code.

When the user wants to be identified, they go to a remote authenticator 716 and get a verification code that is created there by them connecting their device 708 (which for this use case is the same device 708 used in the trusted authority 702). In some embodiments the verification code, or part of the verification code, is used as a crypto key to encrypt information transfer at the remote authenticator 716. The user's device 708 then sends N-bits of the shared secret random number from the verification code generated on the earlier encounter with the trusted authority 702 over the classical network 714. This shared secret random number from the verification code is sent over the classic network 714, because it has no meaning to any observer than trusted authority 702. The trusted authority looks for a match with shared secret random number from the verification code in the secure repository 704. If there is a match, it must be the user, and a YES is sent to the device 720 at the remote authenticator 716. This, then, serves to authenticate the user in the system 700. As indicated herein, a user can be, for example, an individual, a sensor, a computing device, a robot, a machine, a drone and numerous other persons or devices that have an identity and/or a role in a system.

In some embodiments, the trusted authority 702 now sends to the user the next N-bits of the shared secret shared secret random number from the verification code via the classical network 714. Note that only trusted authority 702 and end user device 708 knows these bits. So, when the user receives the bits they know it must be from the trusted authority with which the initial encounter occurred.

In some embodiments, it is possible that in the remote authenticator 716 classical exchanges between the device 708 and other device 720 also perform additional sharing of combs to find error free bits. In some embodiments, it can be even more secure to send the noise bits too, and do the cross-correlation, or matching process, post-facto, at the authentication event in the remote authenticator 716. This way the transaction looks even more non-sensical, like noise, to an observer. The voracity of the trusted authority 702 depends on the handheld device 708 data and repository data 708 being kept secure by the user and trusted authority 702.

Referring to both FIGS. 1 and 7, in some embodiments, the device 106, 720 is a point-of-sale terminal. In some embodiments, the verification code is used to mark a purchase. In some embodiments, the verification code is used as a crypto key and verification of a credit card number in a point of sale transaction. In some embodiments, the verification code is used to provide access, and the authentication terminal 106, 720 is used to grant access. These are just examples of uses for the verification method using entangled photons of the present teaching.

One feature of the authentication and verification system and method using entangled photons of the present teaching is that it supports travelling, or mobile, use of quantum secret information. This is at least in part because the shared random number derived from measurements of entangled photons can be used in multiple ways. For example, some or all of the random number can be used as a nonce. The word nonce is a contraction for number used once. Nonces are single-use random or pseudo random numbers used by protocols for authentication and other purposes. Nonces allow users to take some of the shared random number created in one location to a second location. The single use of the shared nonce provides verification that the user was at the location where the nonce was generated. As a single use random number, the nonce cannot be recreated by a nefarious third party. So, as long as the user maintains control of the device (e.g. away from a nefarious user) and does not expose the nonce until its single use, that single use can be used to verify the identity of the user and connection to the location with the shared nonce. The mobile use can be implemented in numerous configurations as desired for different applications. Some examples are described further below.

Figure 8A:
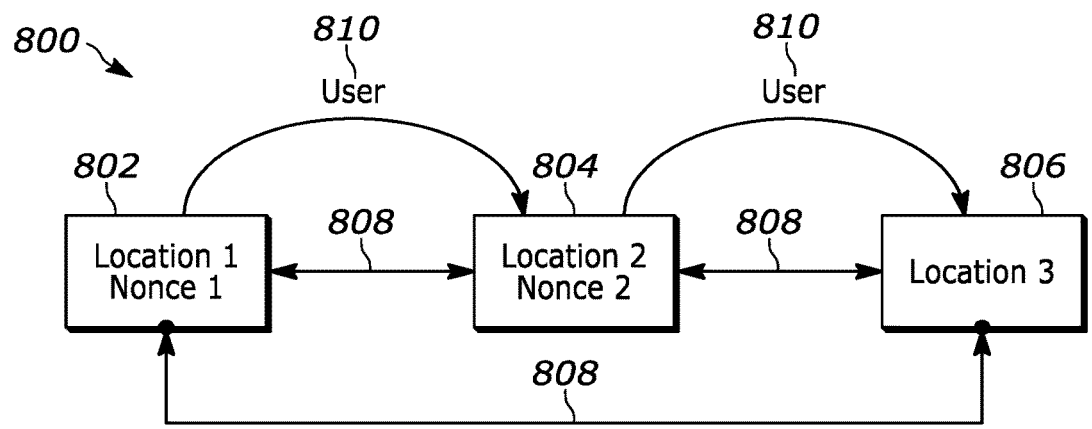
FIG. 8A illustrates an embodiment of an authentication and verification system and method using entangled photons in a linear, or chain, configuration.

FIG. 8A illustrates an embodiment of an authentication and verification system and method 800 using entangled photons in a linear, or chain, configuration. Multiple locations 802, 804, 806 are connected, for example using a communication network 808 that interconnects the locations 802, 804, 806. A user 810 can travel to different locations 802, 804, 806, and receive shared random numbers from these locations 802, 804, 806. The shared random numbers can be used as described herein for authentication and verification, as verification codes and/or as encryption keys and for other purposes. In some embodiments, such as that shown in system and method 800, the user 810 can travel between locations 802, 804, 806 in a linear, or chained, configuration. At a first location, location1 802, the user 810 uses part of the shared random number as a nonce, referred to as nonce1. The shared random number is provided to location1 802 and the user over a quantum channel.

The user 810 then travels to a second location, location2 804. Location2 804 uses nonce1 to authenticate the user 810 by sharing nonce1 with location1, and receiving back from location1 indication that nonce1 is associated with the user 810. Sharing between location1 and location2 is over the classical communication network 808. Location2 804 shares a secret random number with user 808 and part of that shared random number is used as nonce2 by the user 810. The nonce can be shared with the location using and encrypted exchange between the user 810 and location2 804, and the encryption can use part of the shared secret random number as the cryptographic key.

The user 810 then travels to a third location, location3 806. Location3 806 uses nonce2 to authenticate the user 810 by sharing nonce2 with location2 804, and receiving back from location2 804 indication that nonce2 is associated with the user 810. Location3 806 can also be informed of the chain of authentication from location1 802 via location2 804, which has previously authenticated with location1 802. The chain can continue in a similar manner as the user 810 moves to additional locations (not shown).

Figure 8B:
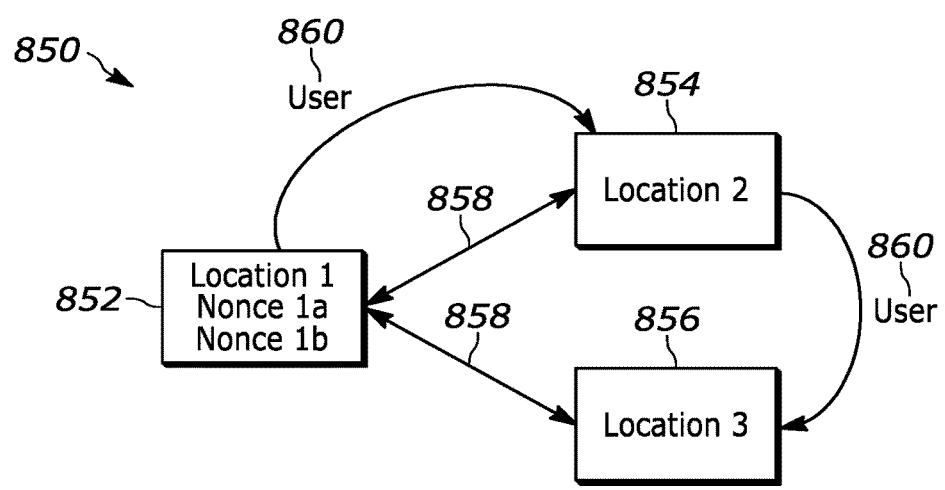
FIG. 8B illustrates an embodiment of an authentication and verification system and method using entangled photons in a tree, or centralized, configuration.

FIG. 8B illustrates an embodiment of an authentication and verification system and method 850 using entangled photons in a tree, or centralized, configuration. A central or root location, location1 852 is used as a centralized authentication location. Two additional locations, location2 854 and location3 856 each connect to location1 852 using a communication network 858. Note that this connection configuration does not preclude communication between location2 and location3, but communication is not needed for both locations 854, 856 to authenticate a user 860. The user 860 starts at location1 852 and generates a shared random number via a quantum channel and uses at least some of it to produce multiple nonces shared with location1, e.g. nonce1a and nonce1b. The user 860 can travel to the other locations 854, 856, and receive shared random numbers from these locations 854, 856. The shared random numbers can be used as described herein for authentication and verification, as verification codes and/or as encryption keys and/or to authenticate a user and/or to authenticate a credential and/or for other purposes.

In some embodiments, such as that shown in the centralized system and method 850 configuration, once leaving location1, the user 850 can travel to a second location, location2 854. Location2 854 uses a nonce provided by the user 860, e.g. nonce1a, to authenticate the user 860 by sharing nonce1a with location1 852, and receiving back from location1 852 indication that nonce1a is associated with the user 860. Sharing between location1 852 and location2 854 is over the classical communication network 858. While nonces can be shared between user 860 and location2 854, there is no need to do so in order for the user 860 to be authenticated at another location. For example, the user 860 can travel to a third location, location3 856. Location3 856 uses nonce1b to authenticate the user 860 by sharing nonce1b with location1 852, and receiving back from location1 852 indication that nonce1b is associated with the user 860. The user 860 can continue traveling to other locations (not shown) in any order and those locations can use other nonces shared between user 860 and location1 852 to authenticate the user 860 at the other locations.

Figure 9A:
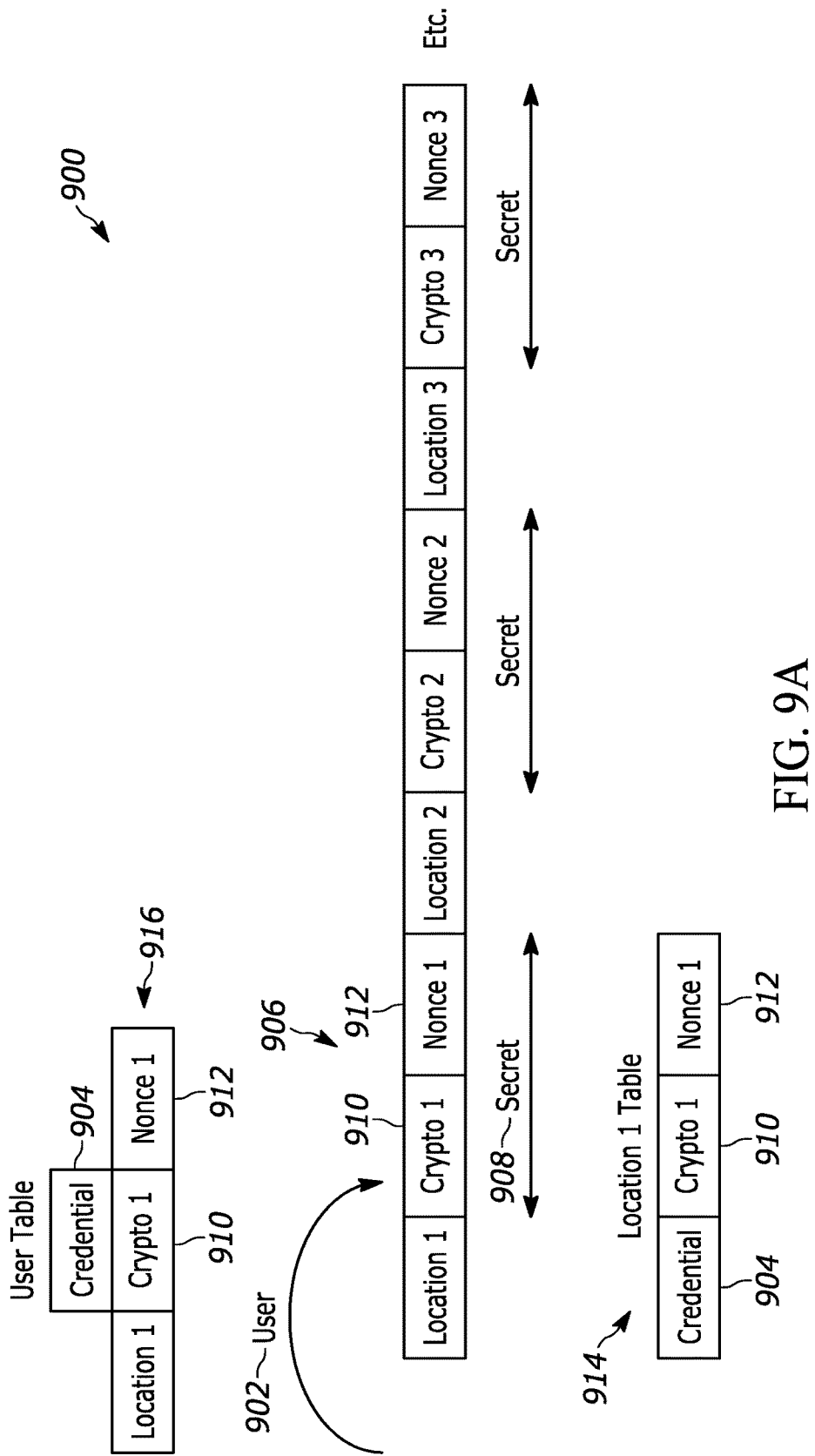
FIG. 9A illustrates an embodiment of a first step in a sequence of steps of an authentication and verification system and method using entangled photons in a linear, or chain, configuration.

FIG. 9A illustrates an embodiment of a first step 900 in a sequence of steps of an authentication and verification system and method using entangled photons in a linear, or chain, configuration. In this embodiment, a user 902 brings a credential 904 for authentication. A credential can be something that it is desirable to keep secret or private. For example, a credential could be one or more of: 1) a credit card; 2) a credit card, with name, date, code on back; 3) a passport number; 4) a passport with number, picture, issue date, address, etc.; 5) a license number; 6) a license with number, picture, date, address, state of issue, etc.; 7) employee identification number; and/or 8) numerous identification items such as product serial numbers for, e.g. devices, animals, and/or goods and services). The credential can be a digital representation of these things.

The user 902 arrives at location1 906. The user 902 and location1 906 share a secret 908 using combs as described herein. The secret 908 is divided into crypto1 910 and nonce1 912. Crypto1 is a first cryptographic key, also referred to as a crypto key, that can be used to encrypt data that is sent to locations that also have crypto1. In general, herein "cryptox" refers to a crypto key indexed to x. The user 902 uses crypto1 910 to send the credential 904 to location1. Location1 906 uses crypto1 910 to tell the user 902 it is at location1 906. Location1 906 keeps location1 table 914 with credential 904, crypto1 910 and nonce1 912. User 902 keeps user table 916 that associates location1 with credential 904, crypto1 910 and nonce1 912.

Figure 9B:
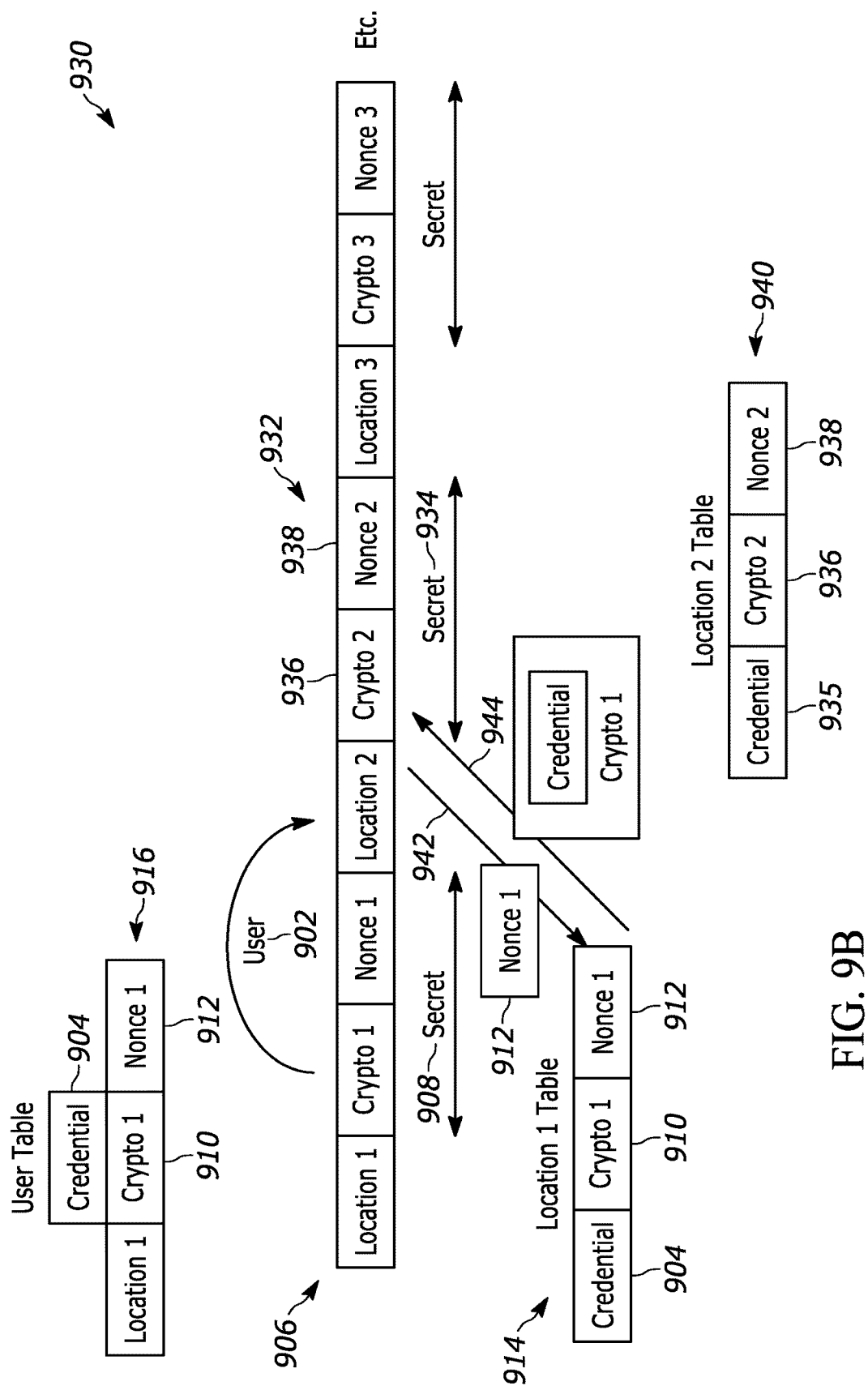
FIG. 9B illustrates an embodiment of a next step in a sequence of steps of an authentication and verification system and method of FIG. 9A.

FIG. 9B illustrates an embodiment of a next step 930 in a sequence of steps of an authentication and verification system and method of FIG. 9A. The user 902 moves from location1 906 to location2 932, keeping in memory the values of location1, crypto1 910, nonce1 912. The user 902 and location2 932 share a quantum secret 934. The secret 934 is divided into crypto2 936 and nonce2 938. The user 902 uses crypto2 936 to encrypt and send the credential 904 to location2 932. The user uses crypto2 936 to encrypt and send location1, nonce1 912 and crypto1 910 to location2 932. Thus, location2 has table 940 containing a local credential 935 (that is the same as credential 904), crypto2 936 and nonce2 938. Location2 932 also has crypto1 910, allowing it to decrypt messages from location1 that are encrypted with crypto1. Location2 932 sends 942 nonce1 912 to location1 in cleartext. Location1 906 sends 944 the credential 904 encrypted with crypto1 to location2. Location2 932 matches the credential 935 that it has locally in table 940 with the decrypted credential sent from location1 906. This step 930 serves to verify the credential 904, and authenticate the user 902 at location2 932. This can also be referred to as certifying the credential of the user.

Figure 9C:
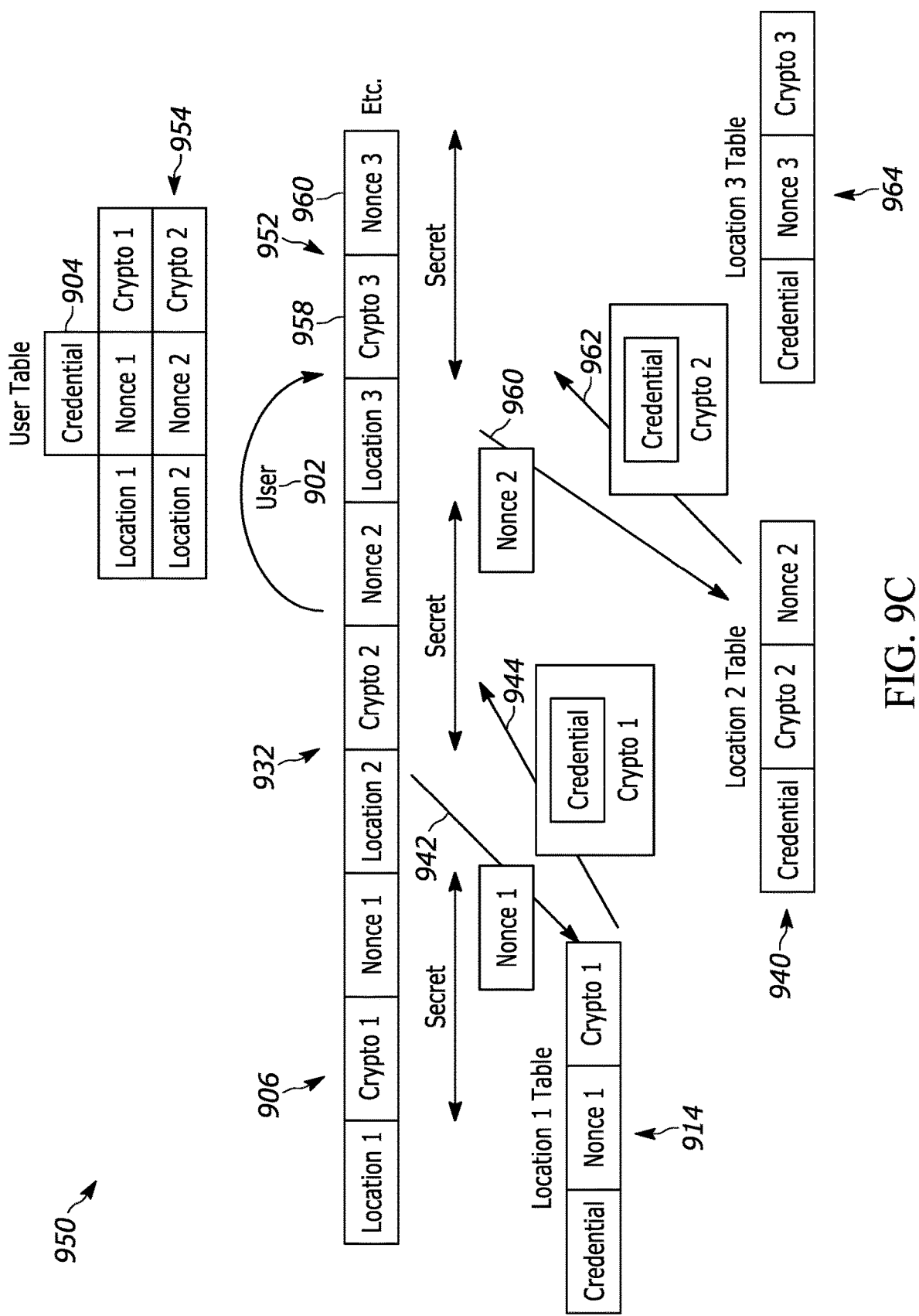
FIG. 9C illustrates an embodiment of a next step in a sequence of steps of an authentication and verification system and method of FIGS. 9A and 9B.

FIG. 9C illustrates an embodiment of a next step 950 in a sequence of steps of an authentication and verification system and method of FIGS. 9A and 9B. The user 902 now arrives at location3 952. The user 902 has in memory a new table 954 that has now been extended from table 916 to include all previous locations, nonces and cryptos. The user 902 and location3 952 share a quantum secret 956 using combs as described herein. The secret 956 is divided into crypto3 958 and nonce3 960. User uses crypto3 958 to send the credential 904 to location3 952. The user 902 uses crypto3 958 to send location2 and nonce2 to location3 952. Location3 952 sends 960 nonce2 to location2. Location2 sends 962 the credential from table 940 encrypted in crypto2 to location3. The authenticates the user 902 as someone who has visited location2 932. Location3 952 decrypts the credential send from location2 932 and matches the local credential provided by the user 902 to the credential provided by the user 902. This verifies the credential provided by the user 902 to location3 952. Location3 will keep in table 964 the credential, nonce3 and crypto3, for future authentication of user 902 and future verification of the user's credential.

Figure 10:
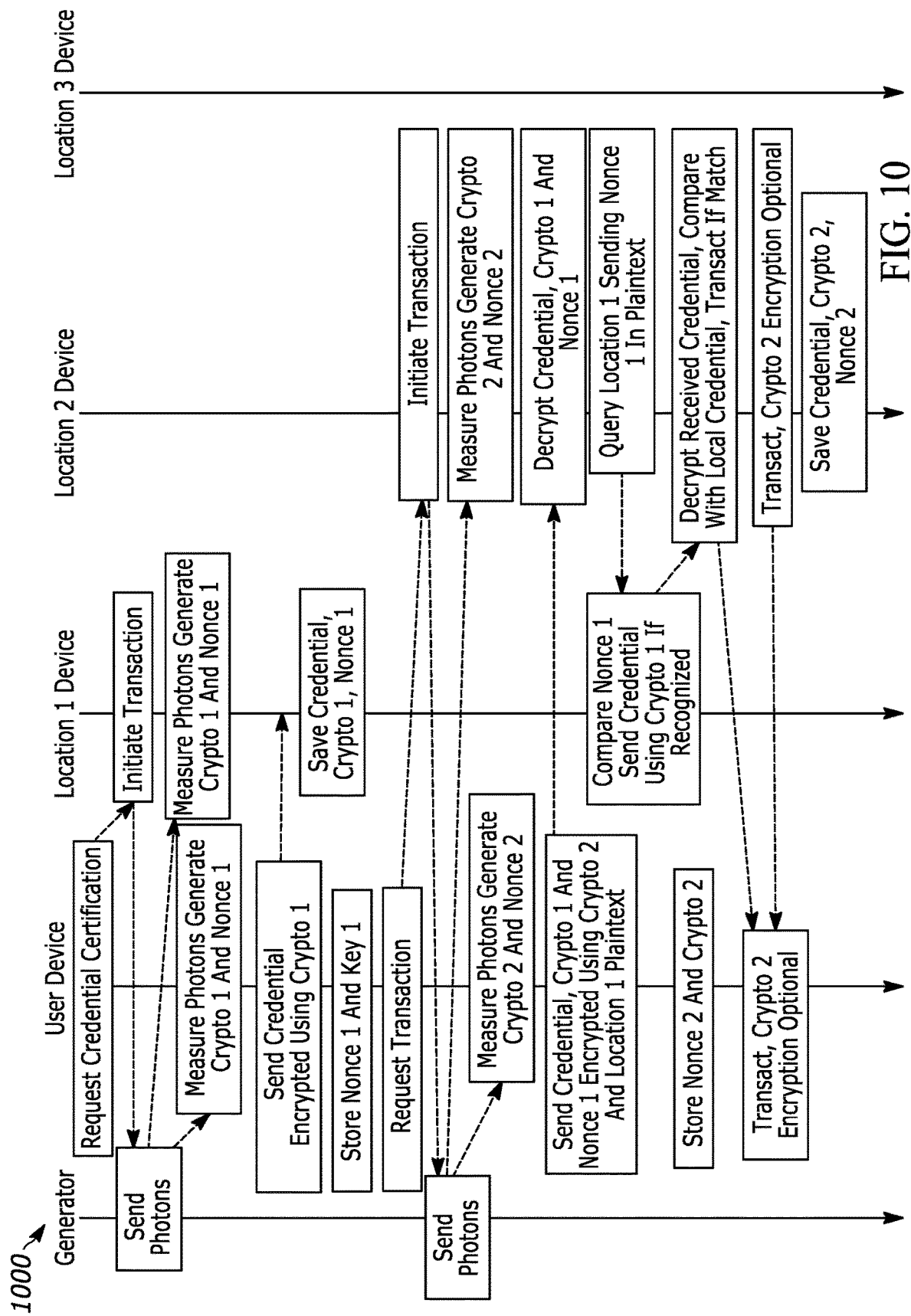
FIG. 10 illustrates an embodiment of a timing diagram of steps of an authentication and verification system and method using entangled photons in a linear, or chain, configuration.
Figure 10:
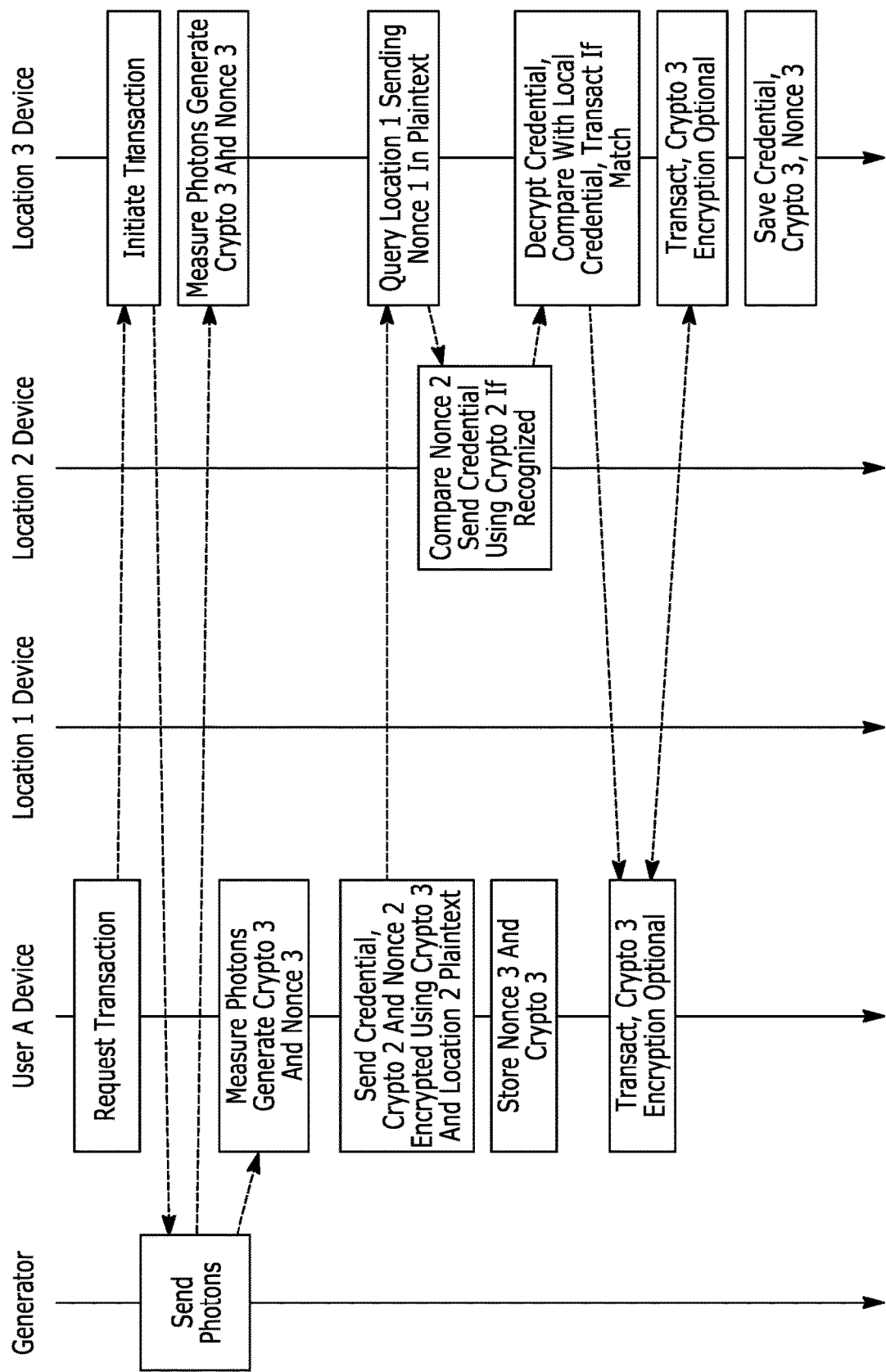

FIG. 10 illustrates an embodiment of a timing diagram 1000 of steps of an authentication and verification system and method using entangled photons in a linear, or chain, configuration. This could be, for example a configuration similar to that described in connection with FIG. 8A and/or FIGS. 9A-C. A user uses a device, for example a cell phone or handheld device, to request credential certification at a location. The location has processing equipment, for example a point-of-sale device, a computer, identity processing equipment, or other processing device. The user and location are equipped to engage in wireless exchanges of information that are classical. The user and location are equipped to receive and process entangled photons at the location. The credential could be, for example a license or a credit card, or numerous other credentials. The location could be, for example a division of motor vehicles location, a bank location, an employment location or a passport processing location, or numerous other locations that can provide credentials, and particularly credentials that are used multiple times by a system or user. These are just examples. Numerous kinds of authentication and verification systems and applications can benefit from the method and system described herein.

Referring to FIG. 10, the user engages in an authentication and verification method by arriving at a location that provides certification of a credential and requesting credential certification. This step is performed, for example, by a wireless exchange between a user device and a location device. The location initiates the exchange of a shared secret between the user and the location, requesting an entangled source generator to provide entangled quantum states (e.g. entangled photon pairs) to the two devices. Each device measures and processes the quantum states provides by the generator. The quantum states can be photons hyper-entangled in polarization and emitted at random correlated times, and the two devices generate a shared random number based on the measured polarization states. Entangled states are determined at each device by sharing and processing time-based combs to determine which measured polarization states are entangled. This is just an example of sharing a secret using combs.

The shared secret is divided by an agreed to division into a crypto, that is a shared random number used as a key of any desired length, and a nonce. The nonce is also a shared random number and is intended to be used only once. For clarity of description we refer to the crypto and nonce generated at location1 as crytpo1 and nonce1. The shared random number can be split into numerous cryptos and nonces at any given location, as desired. The user encrypts the credential using crypto1 and sends to location1 device, and location1 saves the credential and the nonce1. The location1 can verify the credential by some means. As just one example, location1 can check a birth certificate of a user, so verifying and identity and attaching that identity to the credential, e.g. a driver's license. The user saves nonce1 and crypto1 (which may also be referred to as key1) for later use.

The user then moves to a new location, location2, which is similarly configured with a device for authentication and verification as location1. However, location2 may not have all the same features of location1, as location2 can be a simpler system that just checks credentials, and does not necessarily perform additional checks on the user. That is, location2 may just authorize and transact with the user, location2 may authorize, transact and vouch for the user as having been at location2 (as in the embodiment illustrated in FIG. 10), or location2 may provide the same or additional checks on the user and/or credential as location1, as is desired by the application or system practicing the method and system of the present teaching. This can be referred to as the location2 certifying the credential provided by the user.

In the embodiment illustrated in FIG. 10, the user requests a transaction at location2. Location2 initiates the exchange of a shared secret between the user and location2, requesting an entangled source generator to provide entangled quantum states (e.g. entangled photon pairs) to the two devices. The entangled generator for location2 can be the same as the generator used for location1, or it can be a different generator. Each device measures and processes the quantum states provides by the generator and produces a shared secret that is divided into a crypto2 and nonce2. The user encrypts the credential, crypto1 and nonce1 and sends them to location2. Information is also exchanged with the identity of location1, which can be done in open or in plaintext. For example, the exchange can be a wireless communication between the user device and location2 device. Location2 decrypts the received crypto1, nonce1 and credential.

Location2 queries location1 (e.g. using any known network communication, such as the internet), and can send nonce1 in plaintext. Location1 receives the query and performs a match operation on nonce1. The location1 finds matched nonce1 is associated with the credential and crypto1, and the location1 sends the credential encrypted using crytpo1 back to location2. Location2 decrypts the received communication from location1 to uncover the credential. Location2 can check that the received credential is a match to the credential provided locally by the user. Location2 can proceed with the transaction based on a match. The transaction can be, for example, a purchase, a building entry, entry across a border, exchange of sensor information, or numerous other transactions. The transaction can use crypto2 to encrypt private information exchanged during the transaction. The transaction can use other parts of the shared secret to complete the transaction. In some embodiments, the user stores crypto2 and nonce2 for future use. In some embodiments, location2 stores any or all of the credential, crypto2 and nonce2 for future use.

The user than moves to a location3. The user requests a transaction at location3. Location3 initiates the exchange of a shared secret between the user and location3, requesting an entangled source generator to provide entangled quantum states (e.g. entangled photon pairs) to the two devices. The entangled generator for location3 can be shared with one or more other locations or it can be a separate generator. The user device and device in location3 measure and process the quantum states provides by the generator and produces a shared secret that is divided into at least a crypto3 and nonce3. The user encrypts, using crypto3, the credential, crypto2 and nonce2 that it has stored and sends them to location3. Information is also exchanged with the identity of location2, which can be done in open or in plaintext. Location3 decrypts the received crypto2, nonce2, and credential.

Location3 queries location2, sending nonce2 in plaintext. Location2 receives the query and performs a match operation on nonce1. The location2 finds matched nonce2 is associated with the credential and crypto2, and location2 sends the credential encrypted using crytpo2 back to location3. Location3 decrypts the received communication from location2 to uncover the credential. Location3 can check that the received credential is a match to the credential provided locally by the user, thereby certifying the credential. Location3 can proceed with the transaction with the user based on a match. Various aspects of the transaction can be encrypted using crypto3. Various aspects of the transaction can use parts of the shared secret random number to execute the transaction. In some embodiments, the user stores crypto3 and nonce3 for future use. In some embodiments, location3 stores any or all of the credential, crypto3 and nonce3 for future use.

Figure 11A:
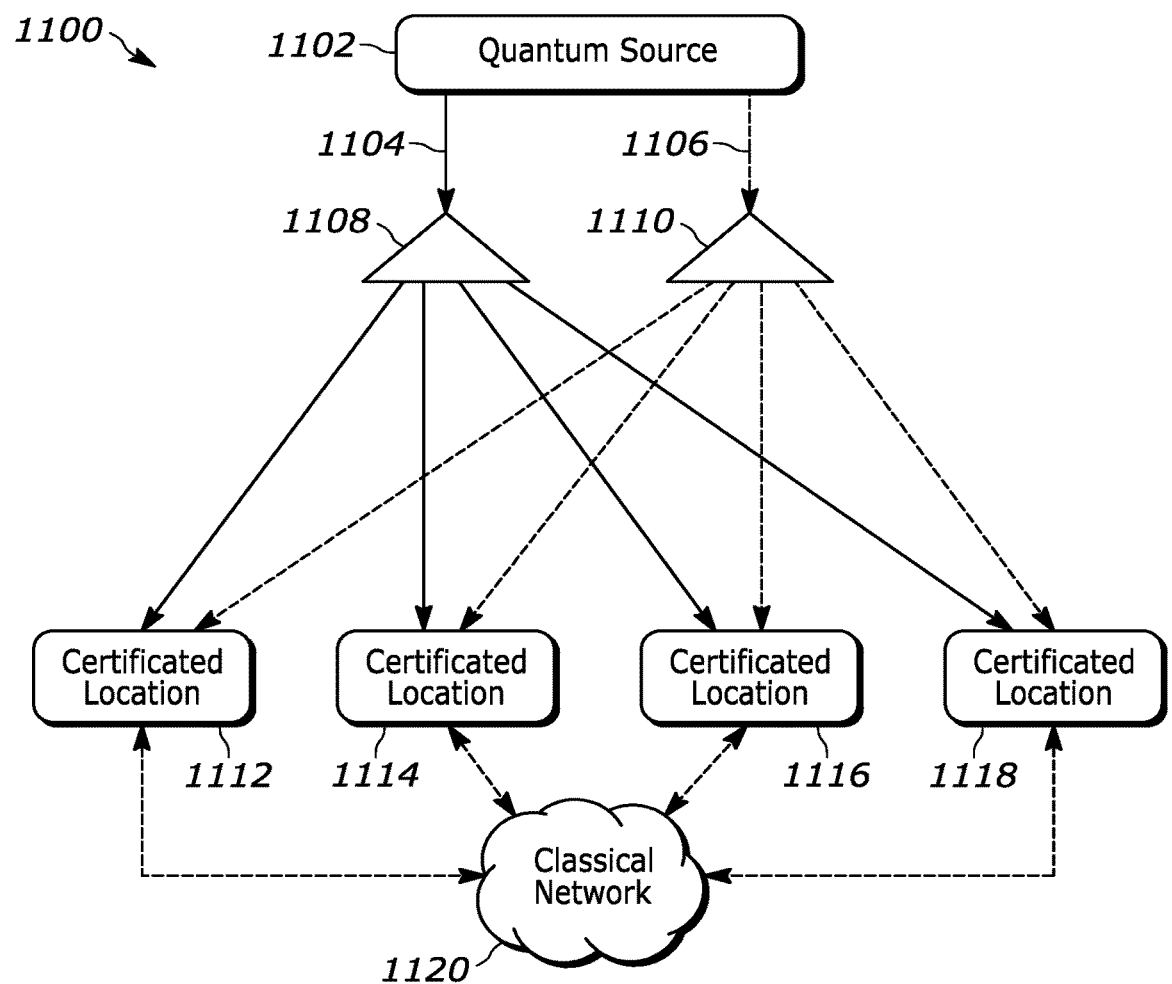
FIG. 11A illustrates an embodiment of pairwise location certification system for an authentication and verification system and method using entangled photons.

FIG. 11A illustrates an embodiment of pairwise location certification system 1100 for an authentication and verification system and method using entangled photons. A quantum source 1102 generates pairs of entangled quantum states. For example, the quantum source 1102 can produce pairs of hyperentangled photons. One photon of the pair is emitted at one port, and the other photon of the pair from a second port. The entangled photons are distributed using distribution elements 1108, 1110 to multiple locations 1112, 1114, 1116, 1118. The locations are connected using a classical communication network 1120. The distribution elements 1108, 1110 are configured to distribute the pairs of photons such that particular pairs of locations receive sets of photons that are entangled. For example, the distribution elements 1108, 1100 can include switches that direct the photons to different outputs that are optically coupled to particular locations and the switches are configured to ensure that particular pairs of locations receive sets of photons that are entangled. The source 1102 could be, for example positions in one or more satellites and photons are distributed in free space channels to ground stations that could be antennas at each location. The source 1112 could be a terrestrial source that distributes photons in optical fiber and/or free space to the locations 1112, 1114, 1116, 1118.

The locations 1112, 1114, 1116, 1118 generate pairwise shared secrets by measuring entangled quantum states, that can be identified by sharing combs in one entangled dimension and using the other dimension as a shared random number. By comparing numbers and determining a match, these locations become pairwise certified, providing a measure of added security that locations are a valid part of the authentication and verification system. This allows, for example, more assurance that a response to a query for the verification of a credential using a nonce between two locations is valid and has not been faked by a nefarious third party.

Figure 11B:
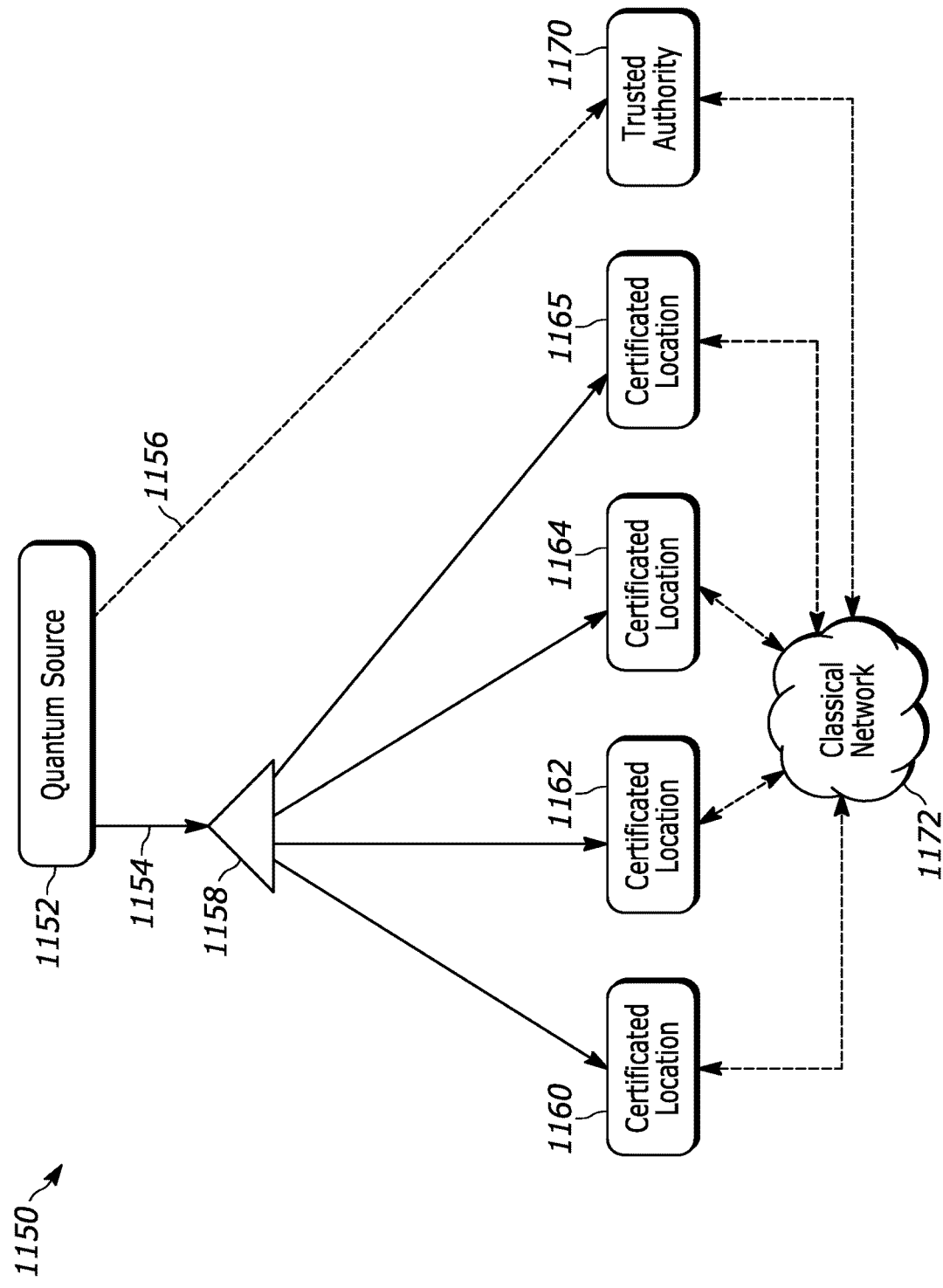
FIG. 11B illustrates an embodiment of centralized location certification system for an authentication and verification system and method using entangled photons.

FIG. 11B illustrates an embodiment of centralized location certification system 1150 for an authentication and verification system and method using entangled photons. A quantum source 1152 generates pairs of entangled quantum states. For example, the quantum source 1152 can produce pairs of hyperentangled photons. One photon of the pair is emitted at one port 1154, and the other photon of the pair from a second port 1156. One of the pairs from the pairs of entangled photons are distributed using a distribution element 1158 to multiple locations 1160, 1162, 1164, 1168. The other of the pairs (from port 1156) from the pairs of entangled photons is provided to a trusted authority location 1170. The locations 1160, 1162, 1164, 1168, 1170 are connected using a classical communication network 1172. The distribution element 1158 is configured to distribute the one of the pair to locations 1160, 1162, 1164, 1168 such that each locations receives a set of photons that are entangled with a known partition of sets of photons sent to the trusted authority 1170. For example, the distribution element 1158, can include one or more switches that direct the photons to different outputs that are optically coupled to particular locations 1160, 1162, 1164, 1168 and configured to ensure that the locations receive sets of photons that are entangled with known sets of photons at the trusted authority 1170. For example, the source 1152 could be located in space or on the ground and the photons can be transmitted over free space and/or optical fiber.

The locations 1160, 1162, 1164, 1168 generate shared secrets with the trusted authority by measuring entangled quantum states that are identified by sharing combs between a location 1160, 1162, 1164, 1168 and the trusted authority 1170 that use one entangled basis. The other measured entangled forms the shared random number. By comparing the generated shared random numbers with the trusted authority and determining a match, these locations become certified, providing a measure of added security that locations are a valid part of the authentication and verification system. This allows, for example, more assurance that a response to a query for the verification of a credential using a nonce between two locations is valid and has not been interfered with by a nefarious third party.

One feature of the present teaching is that is helps to prevent someone pretending to be a different user than they are (i.e. a masquerade attack). A nefarious user, if they want to masquerade as someone else would have to know the nonce from the visit to other locations, at least one of which is a trusted authority. The nefarious user would also need to know that nonce's pairing with a particular credential. This is prevented as long as the legitimate user maintains control over the device used in the transactions. A nefarious user cannot learn these things by snooping classical communications, and is also prevented from sharing in the quantum exchange by quantum principles.

One feature of the present teaching is that when over the air local exchanges are made, parts of the shared random number can be used as encryption keys to encrypt parts of the exchange that need to be kept private. One feature of the present teaching is that when a next location asks a previous location if a user was there, they can do this by sending a nonce in plaintext over a classical network. A nonce is nonsense to any observer that did not participate in the quantum comb exchange. That is, parties that did not receive, measure and process entangled quantum states so as to hold a quantum shared secret. As quantum entanglement is carried by single photons and shared, for these examples, but only two photons, this quantum sharing is highly limited, and as such highly secure.

One feature of the present teaching is that the exchanges are designed to prevent a third party from pairing a nonce with a user. For example, the response from a queried location, which includes a user credential, if sent in plaintext, would allow a third party to pair a nonce with a credential. That is why the system and method encrypts this exchange using the queried location's crypto key from the user's previous visit.

One feature of the present teaching is it prevents a fake location from participating in the authentication and verification. To certify locations, the system shares quantum secrets at each location either with a trusted authority and/or pairwise with other locations. In each interaction with a location, a certificate generated from these photons would be included in the packet. That certificate could be sent to the trusted authority for verification. The verification and/or certification is optional. One feature of the present teaching is the recognition that trust can be thought of as a directed graph which points back to something trusted. The something trusted could be considered, for example, location1 in the examples provided in connection with the description of FIGS. 8A-B, 9A-C and 10.

It should be understood that one feature of the present teaching is that a property of the credential can change over time. For example, in some embodiments, a property of a credential can be changed based on a transaction at a location. The property can be a value. For example, in some embodiments, the credential can have an initial value from a first location, and that value can be changed at each subsequent location. The value can go up or down. The credential with the new value is associated with the nonce in the location where the new value was generated. This feature supports for example, tracking of values that change during transactions and/or values of balances. These values can be associated with a debit card and/or gift card and/or other digital currency that change over a sequence of interactions (e.g. financial or other transactions) with different locations. These interactions and changes in value can be verified and tracked using the method and system of the present teaching.

One feature of the present teaching is that it can be use as part of or in augmentation to a block chain system. Block chains have a number of attributes that are common with the present teaching. For example, in block chain there is a chain of connected data blocks. In some embodiments of the present teaching, data blocks consist of where the user has been. For example, in block chain there is a nonce that is generated randomly for each block. Nonces of the present teaching are generated in a truly random sense by quantum means between the user and each location visited. There is a hash wedded to the nonce in a block chain. The hash connects the last block to the next block and is computationally difficult to fake. In contrast, some embodiments of the present teaching, rather than a hash, use a crypto key generated and shared by quantum means to securely check the integrity of the chain (the last place the user was). Thus, the chains of the present teaching are not protected by computational complexity, they are protected by quantum means. As another example, in block chain, inverting the hash is computationally difficult, and to decode the entire chain and so it is necessary to invert n hashes where n is the number of blocks, thus making it difficult to break. In contrast, embodiments of the present teaching rely on knowing the quantum shared secret which make it difficult to go back even one block in the chain without the shared quantum secret. If any step in the chain is broken, the last block will return a negative.

Thus, one aspect of the present teaching is a method of certifying a credential that includes generating a first shared secret random number by measuring one of a first pair of entangled photons using a first device and by measuring another of the first pair of entangled photons using a second device. The first device can be a cell phone and can be used to store an electronic credential such as a passport, a driver's or other type of license, a credit card, or a product serial number or identifier. In some methods, the first device can be a user device and the second device can be a Point of Service (POS) device.

In various embodiments, the entangled photons can originate from a satellite. Also, the entangled photons can be directed to pairs of locations or to locations and a trusted authority. In various embodiments, the credential can be a digital representation of a credit card, a digital representation of a passport, a digital representation of an employment identification, or a digital representation of a product serial number.

In one embodiment, the generating the first shared secret random number by measuring one of the first pair of entangled photons using the first device and by measuring the other of the first pair of entangled photons using the second device further can include sharing a comb between the first device and the second device. The comb can comprise a time-based state comb. The measuring one of the first pair of entangled photons can include measuring a polarization value.

The first shared secret random number is divided into a first cryptographic (crypto) key and a first nonce. The first nonce is associated with a credential. The first crypto key, the first nonce, and the credential in the first device are stored. Also, the first crypto key, the first nonce, and the credential are stored in the second device. Associating the nonce can include sending from the first device to the second device to establish the nonce. Also, associating the nonce can include sending the credential from the second device to the first device. In some methods the associating is performed after verifying information contained in the credential.

A second shared secret random number is generated by measuring one of a second pair of entangled photons using the first device and by measuring another of the second pair of entangled photons using a third device. The first device can be associated with a user. The user can be a person or a machine in various methods. The second device can be associated with a location and the location can be a bank, a passport office, a licensing station, and/or a business. The third device can be associated with a location. Some methods include certifying the location associated with the first device and the location associate with the third device by measuring entangled photons in each location.

The second shared secret random number is divided into a second crypto key and a second nonce. The first crypto key, the first nonce, and the credential is encrypted at the first device, where the encryption is performed using the second crypto key. The encrypted first crypto key, first nonce, and credential are sent from first device to the third device. The sent encrypted first crypto key, first nonce, and credential is then decrypted at the third device using the second crypto key. Then, the third device sends to the second device. Then, it is determined at the second device if the first nonce sent by the third device matches the first nonce stored in the second device. Then, at the second device encryption is performed for the credential stored in the second device, wherein the encryption is performed using the first crypto key, and sending the encrypted credential to the third device if the first nonce received from the third device is determined to match the first nonce stored in the second device. The encrypted credential sent by the second device at the third device are then decrypted. At a third device, it is determined if the decrypted encrypted credential sent by the first device matches the decrypted encrypted credential sent by the second device. The credentials are certified if a match is determined.

Various methods according to the present teaching can include storing in the first device the second crypto key and the second nonce and storing in the third device the second crypto key, the second nonce and the credential. Also, various methods according to the present teaching can include generating a third shared secret random number by measuring one of a third pair of entangled photons using the first device and by measuring the other of the third pair of entangled photons using a fourth device. At least some of the generated third shared secret random number can be used to certify the credential stored in the first device.

EQUIVALENTS

While the Applicant's teaching is described in conjunction with various embodiments, it is not intended that the applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A method of generating a nonce, the method comprising:
   a) measuring a time-of-arrival (TOA) and a corresponding first or second state value of a plurality of first photons, wherein respective ones of the plurality of first photons are entangled with respective ones of a plurality of second photons in a first basis, which is time, and entangled in a second basis;
   b) generating a first ordered list of the measured times-of-arrival of the plurality of first photons;
   c) measuring a time-of-arrival and a corresponding first or second state value of the plurality of second photons;
   d) generating a second ordered list of the measured times-of-arrival of the plurality of second photons;
   e) determining time-of-arrival matches between the first ordered list and the second ordered list;
   f) determining first or second state values that correspond to the determined time-of-arrival matches between the first ordered list and the second ordered list;
   g) generating a shared secret random number using at least some of the determined first or second state values that correspond to the determined time-of-arrival matches; and
   h) establishing the nonce using at least part of the shared secret random number.

2. The method of claim 1 further comprising associating the nonce with a user.

3. The method of claim 1 further comprising authenticating a user with the nonce.

4. The method of claim 1 further comprising performing verification with the nonce.

5. The method of claim 4 further comprising proceeding with a transaction based on the verification.

6. The method of claim 1 further comprising associating the nonce with a credential.

7. The method of claim 6 wherein the transaction comprises at least one of a purchase, a financial transaction, a building entry, a country border entry or an exchange of sensor information.

8. The method of claim 1 further comprising sending the nonce over a classical communication channel.

9. The method of claim 1 further comprising encrypting the nonce.

10. The method of claim 9 wherein the encrypting the nonce comprises encrypting a portion of the shared secret random number.

11. The method of claim 1 further comprising generating a cryptographic key with a portion of the shared secret random number.

12. The method of claim 1 further comprising physically moving the nonce from a first physical location to a second physical location.

13. The method of claim 12 further comprising verifying that a user was physically at the first location using the nonce at the second location to verify.

14. The method of claim 1 further comprising establishing a block chain with the nonce.

15. The method of claim 1 further comprising generating a cryptographic key with a portion of the shared secret random number and securely checking the integrity of a block chain with the cryptographic key.

16. A method of certifying a credential, the method comprising:
   a) generating a first shared secret random number by measuring one of a first pair of entangled photons using a first device and by measuring another of the first pair of entangled photons using a second device;
   b) dividing the first shared secret random number into a first cryptographic (crypto) key and a first nonce;
   c) associating the first nonce with the credential;
   d) storing the first crypto key, the first nonce, and the credential in the first device;
   e) storing the first crypto key, the first nonce, and the credential in the second device;
   f) generating a second shared secret random number by measuring one of a second pair of entangled photons using the first device and by measuring another of the second pair of entangled photons using a third device;
   g) dividing the second shared secret random number into a second crypto key and a second nonce;
   h) encrypting the first crypto key, the first nonce, and the credential with a second crypto key at the first device, and sending the encrypted first crypto key, first nonce, and credential from the first device to the third device;
   i) decrypting the sent encrypted first crypto key, first nonce, and credential at the third device using the second crypto key;
   j) sending from the third device to the second device, the first nonce from the decrypted sent encrypted first crypto key, first nonce, and credential;
   k) determining at the second device if the first nonce sent by the third device matches the first nonce stored in the second device;
   l) Encrypting at the second device, the credential stored in the second device, wherein the encryption is performed using the first crypto key, and sending the encrypted credential to the third device if the first nonce received from the third device is determined to match the first nonce stored in the second device;
   m) decrypting the encrypted credential sent by the second device at the third device; and
   n) determining at the third device if the decrypted encrypted credential sent by the first device matches the decrypted encrypted credential sent by the second device and certifying the credential if a match is determined.

17. The method of claim 16 wherein generating the first shared secret random number by measuring one of the first pair of entangled photons using the first device and by measuring the other of the first pair of entangled photons using the second device further comprises sharing a comb between the first device and the second device.

18. The method of claim 17 wherein the measuring one of the first pair of entangled photons comprises measuring a polarization value.

19. The method of claim 16 further comprising storing in the first device, the second crypto key, and the second nonce; and storing in the third device the second crypto key, the second nonce and the credential.

20. A method of certifying a credential, the method comprising:
   a) generating a first and a second shared secret random number by performing matching processes on a first and on a second event list that contain correlated quantum state values;
   b) dividing the first shared secret random number into a first cryptographic (crypto) key and a first nonce;
   c) associating the first nonce with the credential;
   d) dividing the second shared secret random number into a second crypto key and a second nonce;
   e) encrypting the first crypto key, the first nonce, and the credential with the second crypto key;
   f) decrypting the sent encrypted first crypto key, first nonce, and credential using the second crypto key;
   g) determining if the first nonce matches the second nonce; and
   h) certifying the credential if the first nonce matches the second nonce.

* * * * *